(12) United States Patent
Withers-Kirby et al.

(10) Patent No.: US 7,666,386 B2
(45) Date of Patent: Feb. 23, 2010

(54) SOLID CHEMICAL HYDRIDE DISPENSER FOR GENERATING HYDROGEN GAS

(75) Inventors: Sandra Withers-Kirby, College Station, TX (US); John R. Lund, Jr., College Station, TX (US); Brad Fiebig, Bryan, TX (US)

(73) Assignee: Lynntech Power Systems, Ltd., College Station, TX (US)

( * ) Notice: Subject to any disclaimer, the term of this patent is extended or adjusted under 35 U.S.C. 154(b) by 668 days.

(21) Appl. No.: 11/348,282

(22) Filed: Feb. 6, 2006

(65) Prior Publication Data

US 2007/0020172 A1    Jan. 25, 2007

Related U.S. Application Data

(60) Provisional application No. 60/651,043, filed on Feb. 8, 2005.

(51) Int. Cl.
*B01J 7/00* (2006.01)

(52) U.S. Cl. .................. 423/650; 423/60; 423/652; 442/129

(58) Field of Classification Search .............. 423/652
See application file for complete search history.

(56) References Cited

U.S. PATENT DOCUMENTS

| | | | |
|---|---|---|---|
| 3,134,696 A | 5/1964 | Douglas et al. | |
| 3,134,697 A | 5/1964 | Niedrach | |
| 3,297,484 A | 1/1967 | Niedrach | |
| 3,297,485 A | 1/1967 | Tocker | |
| 3,297,490 A | 1/1967 | Barber et al. | |
| 3,432,355 A | 3/1969 | Nledrach et al. | |
| 4,175,165 A | 11/1979 | Adlhart | |
| 4,214,969 A | 7/1980 | Lawrance | |

(Continued)

FOREIGN PATENT DOCUMENTS

GB    937149    9/1963

(Continued)

OTHER PUBLICATIONS

Hue P. Le*, Le Technologies; "Progress and Trends in Ink-jet Printing Technology"; Journal of Imaging Science and Technology; vol. 42, No. 1, Jan./Feb. 1998; 26 pgs.

(Continued)

*Primary Examiner*—Melvin C Mayes
*Assistant Examiner*—Kenneth Vaden
(74) *Attorney, Agent, or Firm*—John A. Fortkort; Fortkort & Houston P.C.

(57) ABSTRACT

A device for generating hydrogen gas is provided. The device (101) comprises a first hydrogen-containing composition (107) that reacts with a second composition to evolve hydrogen gas; a dispenser (105) adapted to apply the first composition to a first porous member (109); and a conduit (111) adapted to supply the second composition to the first porous member. In a preferred embodiment, the first composition is selected from the group consisting of hydrides, borohydrides and boranes, the second composition is water, and the dispenser is spring-loaded and is charged with the first composition. As the first composition reacts with water at the interface to evolve hydrogen gas, the dispenser forces the reaction product across the interface and out of the dispenser, where it will not interfere with the progress of the hydrogen evolution reaction.

76 Claims, 10 Drawing Sheets

U.S. PATENT DOCUMENTS

| | | | |
|---|---|---|---|
| 4,476,196 A | 10/1984 | Poeppel et al. | |
| 4,476,197 A | 10/1984 | Herceg | |
| 4,476,198 A | 10/1984 | Ackerman et al. | |
| 4,499,663 A | 2/1985 | Zwick et al. | |
| 4,510,212 A | 4/1985 | Fraioli | |
| 4,648,955 A | 3/1987 | Maget | |
| 4,666,798 A | 5/1987 | Herceg | |
| 4,855,193 A | 8/1989 | McElroy | |
| 4,876,115 A | 10/1989 | Raistrick | |
| 5,038,821 A | 8/1991 | Maget | |
| 5,171,646 A | 12/1992 | Rohr | |
| 5,190,834 A | 3/1993 | Kendall | |
| 5,211,984 A | 5/1993 | Wilson | |
| 5,336,570 A | 8/1994 | Dodge, Jr. | |
| 5,389,459 A | 2/1995 | Hall | |
| 5,482,792 A | 1/1996 | Faita et al. | |
| 5,593,640 A * | 1/1997 | Long et al. | 422/111 |
| 5,683,828 A | 11/1997 | Spear et al. | |
| 5,804,329 A | 9/1998 | Amendola | |
| 5,833,934 A | 11/1998 | Adlhart | |
| 5,861,221 A | 1/1999 | Ledjeff et al. | |
| 5,863,671 A | 1/1999 | Spear, Jr. et al. | |
| 5,863,672 A | 1/1999 | Ledjeff et al. | |
| 5,948,558 A | 9/1999 | Amendola | |
| 5,952,118 A | 9/1999 | Ledjeff et al. | |
| 6,022,634 A | 2/2000 | Ramunni et al. | |
| 6,040,075 A | 3/2000 | Adcock et al. | |
| 6,250,078 B1 | 6/2001 | Amendola et al. | |
| 6,316,133 B1 | 11/2001 | Bossel | |
| 6,433,129 B1 | 8/2002 | Amendola et al. | |
| 6,468,694 B1 | 10/2002 | Amendola | |
| 6,497,973 B1 | 12/2002 | Amendola | |
| 6,524,542 B2 | 2/2003 | Amendola et al. | |
| 6,534,033 B1 | 3/2003 | Amendola et al. | |
| 6,544,679 B1 | 4/2003 | Petillo et al. | |
| 6,586,563 B1 | 7/2003 | Ortega et al. | |
| 6,670,444 B2 | 12/2003 | Amendola et al. | |
| 6,683,025 B2 | 1/2004 | Amendola et al. | |
| 6,706,909 B1 | 3/2004 | Snover et al. | |
| 6,746,496 B1 | 6/2004 | Kravitz et al. | |
| 6,821,499 B2 | 11/2004 | Jorgensen | |
| 6,932,847 B2 | 8/2005 | Amendola et al. | |
| 6,939,529 B2 | 9/2005 | Strizki et al. | |
| 7,019,105 B2 | 3/2006 | Amendola et al. | |
| 7,083,657 B2 | 8/2006 | Mohring et al. | |
| 7,105,033 B2 | 9/2006 | Strizki et al. | |
| 7,108,777 B2 | 9/2006 | Xu et al. | |
| 7,344,571 B2 * | 3/2008 | Bae et al. | 48/61 |
| 2002/0064709 A1 | 5/2002 | Ovshinsky et al. | |
| 2002/0083643 A1 | 7/2002 | Amendola et al. | |
| 2002/0088178 A1 | 7/2002 | Davis | |
| 2002/0166286 A1 | 11/2002 | McClaine et al. | |
| 2002/0182459 A1 | 12/2002 | Hockaday et al. | |
| 2003/0009942 A1 | 1/2003 | Amendola et al. | |
| 2003/0157018 A1 | 8/2003 | Zaluski et al. | |
| 2004/0009379 A1 | 1/2004 | Amendola et al. | |
| 2004/0009392 A1 | 1/2004 | Petillo et al. | |
| 2004/0011662 A1 | 1/2004 | Xu et al. | |
| 2004/0033194 A1 | 2/2004 | Amendola et al. | |
| 2004/0035054 A1 | 2/2004 | Mohring et al. | |
| 2004/0047801 A1 | 3/2004 | Petillo et al. | |
| 2004/0048116 A1 | 3/2004 | Ord et al. | |
| 2004/0067195 A1 | 4/2004 | Strizki et al. | |
| 2004/0115493 A1 | 6/2004 | Kim | |
| 2004/0120889 A1 | 6/2004 | Shah et al. | |
| 2004/0146754 A1 | 7/2004 | Arthur et al. | |
| 2004/0148857 A1 | 8/2004 | Strizki et al. | |
| 2004/0166057 A1 | 8/2004 | Schell et al. | |
| 2004/0172943 A1 | 9/2004 | Buelow et al. | |
| 2004/0191152 A1 | 9/2004 | Amendola et al. | |
| 2004/0202903 A1 | 10/2004 | deVos et al. | |
| 2004/0214056 A1 | 10/2004 | Gore | |
| 2005/0036941 A1 | 2/2005 | Bae et al. | |
| 2005/0132640 A1 | 6/2005 | Kelly et al. | |
| 2005/0135996 A1 | 6/2005 | Ortega et al. | |
| 2005/0175868 A1 | 8/2005 | McClaine et al. | |
| 2005/0238573 A1 | 10/2005 | Zhang et al. | |
| 2005/0268555 A1 | 12/2005 | Amendola et al. | |
| 2005/0276746 A1 | 12/2005 | Zhang et al. | |
| 2006/0021279 A1 | 2/2006 | Mohring et al. | |
| 2006/0042162 A1 | 3/2006 | Goldstein et al. | |
| 2006/0102489 A1 | 5/2006 | Kelly | |
| 2006/0102491 A1 | 5/2006 | Kelly | |
| 2006/0144701 A1 | 7/2006 | Kelly | |
| 2006/0169593 A1 | 8/2006 | Xu et al. | |
| 2006/0196112 A1 | 9/2006 | Berry et al. | |
| 2006/0225350 A1 | 10/2006 | Spallone et al. | |
| 2006/0236606 A1 | 10/2006 | Strizki et al. | |
| 2006/0269470 A1 | 11/2006 | Zhang et al. | |
| 2006/0292067 A1 | 12/2006 | Zhang et al. | |
| 2006/0293173 A1 | 12/2006 | Zhang et al. | |

FOREIGN PATENT DOCUMENTS

| | | |
|---|---|---|
| JP | 06-052881 | 2/1994 |
| JP | 06-243879 | 9/1994 |
| JP | 07-022047 | 1/1995 |
| JP | 07-209592 | 8/1995 |
| JP | 08-138699 | 5/1996 |
| JP | 10-340735 | 12/1998 |
| WO | WO 2000/031963 | 6/2000 |
| WO | WO 2004/035464 | 4/2004 |

OTHER PUBLICATIONS

Fleming, Lee; "Finding the organizational sources of technological breakthroughs: the story of Hewlett-Packard's thermal ink-jet"; Industrial and Corporate Changes vol. 11, No. 5; pp. 1059-1084.

* cited by examiner

SOLID CHEMICAL HYDRIDE DISPENSER FOR GENERATING HYDROGEN GAS

CROSS-REFERENCE TO RELATED APPLICATION

This application claims the benefit of priority from U.S. Provisional Application No. 60/651,043 filed Feb. 8, 2005, which application bears the same title as the instant application.

STATEMENT OF GOVERNMENT RIGHTS

This invention was made with government support under contract W15P7T-04-C-P415 awarded by the Department of Defense (Army). The government has certain rights in this invention.

BACKGROUND OF THE DISCLOSURE

The present disclosure relates generally to devices for generating hydrogen gas, and more specifically to devices for generating hydrogen gas through the reaction of chemical hydrides with water.

BACKGROUND OF THE DISCLOSURE

Hydrogen generators are devices that generate hydrogen gas for use in fuel cells, combustion engines, and other devices, frequently through the evolution of hydrogen gas from chemical hydrides, borohydrides or boranes. Sodium borohydride (NaBH$_4$) has emerged as a particularly desirable material for use in such devices, due to the molar equivalents of hydrogen it generates (see EQUATION 1 below), the relatively low mass of NaBH$_4$ as compared to some competing materials, and the controllability of the hydrogen evolution reaction:

$$NaBH_4 + 2H_2O \leftrightarrow NaBO_2 + 4H_2 \quad \text{(EQUATION 1)}$$

However, despite the many advantages of NaBH$_4$, its use in hydrogen generators is also beset by certain challenges. In particular, it is frequently found that a substantial amount of unreacted borohydride remains in spent generators. This unreacted material represents a significant decrease in the efficiency of the device, and an increase in the cost per unit of hydrogen gas produced by the generator. A similar problem is encountered in hydrogen generators based on other hydrogen-containing materials.

One apparent cause of this problem relates to the spent byproducts of the hydrogen generation reaction. In order to proceed, this reaction requires physical contact between the reactants, namely, the borohydride and water. Typically, the borohydride is provided in a granular or particulate form. Hence, for the reaction to proceed, water molecules must come into contact with the exposed surfaces of the borohydride granules. As the reaction proceeds, however, the sodium borate byproduct generated by the hydrolysis reaction forms a film of sodium borate (NaBO$_2$) over the surfaces of the borohydride granules, thereby forming a physical barrier between the reactants and halting the reaction before it can proceed to completion. A similar phenomenon is observed with many other hydrogen-containing materials.

Some attempts have been made in the art to overcome this problem. For example, U.S. Pat. No. 6,811,764 (Jorgensen et al.) proposes a hydrogen generation system which utilizes grinding to expose unreacted borohydride for further reaction. However, this approach necessarily reduces the overall energy efficiency of a device that relies on the hydrogen generator as a fuel source, since some energy must be consumed in physically grinding the reactants. Moreover, such an approach is unsuitable for applications in which grinding of the reactants is impractical, due to size or noise limitations or to other considerations.

There is thus a need in the art for a method for improving the efficiency of hydrogen generators without the need for grinding the reactants, and for a system which utilizes this method. There is further a need in the art for a hydrogen generator of improved efficiency which is suitable for use in compact devices, and which does not generate noise. These and other needs are met by the devices and methodologies disclosed herein and hereinafter described.

SUMMARY OF THE DISCLOSURE

In one aspect, a device for generating hydrogen gas is provided. The device comprises (a) a housing; (b) a dispenser disposed within said housing, said dispenser being charged with a hydrogen-containing materials that reacts with a liquid (preferably water or an aqueous solution) to evolve hydrogen gas and being adapted to dispense the material across an interface; and (c) a conduit adapted to supply water to said interface.

In another aspect, a method is provided for generating hydrogen gas. In accordance with the method, a first hydrogen-containing material is provided which reacts with a second material to evolve hydrogen gas. For example, the first material may be a hydride, borohydride, or borane, and the second material may be water. A porous interface is also provided. A compressive force is then applied to the first material such that the first material is pressed against the interface, and the second material is applied in liquid form to the interface while the compressive force is being applied to the first material.

These and other aspects of the present disclosure are described in greater detail below with respect to the systems, methodologies, and software described herein.

BRIEF DESCRIPTION OF THE DRAWINGS

For a more complete understanding of the systems, methodologies, and software described herein and the advantages thereof, reference is now made to the following description taken in conjunction with the accompanying drawings in which like reference numerals indicate like features and wherein.

DETAILED DESCRIPTION

It has now been found that the aforementioned needs may be met through the provision of a hydrogen generation system that utilizes compressive force to maintain contact between the reactants in a hydrogen evolution reaction. For example, in a preferred embodiment, a spring-loaded dispenser is utilized in which a spring-driven plug exerts a compressive force against a solid mass of sodium borohydride, thus pressing the sodium borohydride against a porous reaction interface. The interface is supplied with water through a suitable means. As the sodium borohydride reacts to generate hydrogen gas, the borate reaction byproduct, which is frequently of a softened, mud-like consistency, is pressed through the pores of the interface, thereby exposing fresh unreacted sodium borohydride to the water permeating the reaction interface. Of course, while the use of sodium borohydride in these devices is preferred, various hydrides, borohydrides, boranes, and mixtures of the foregoing may also be used as hydrogen-containing material.

Figure 1:
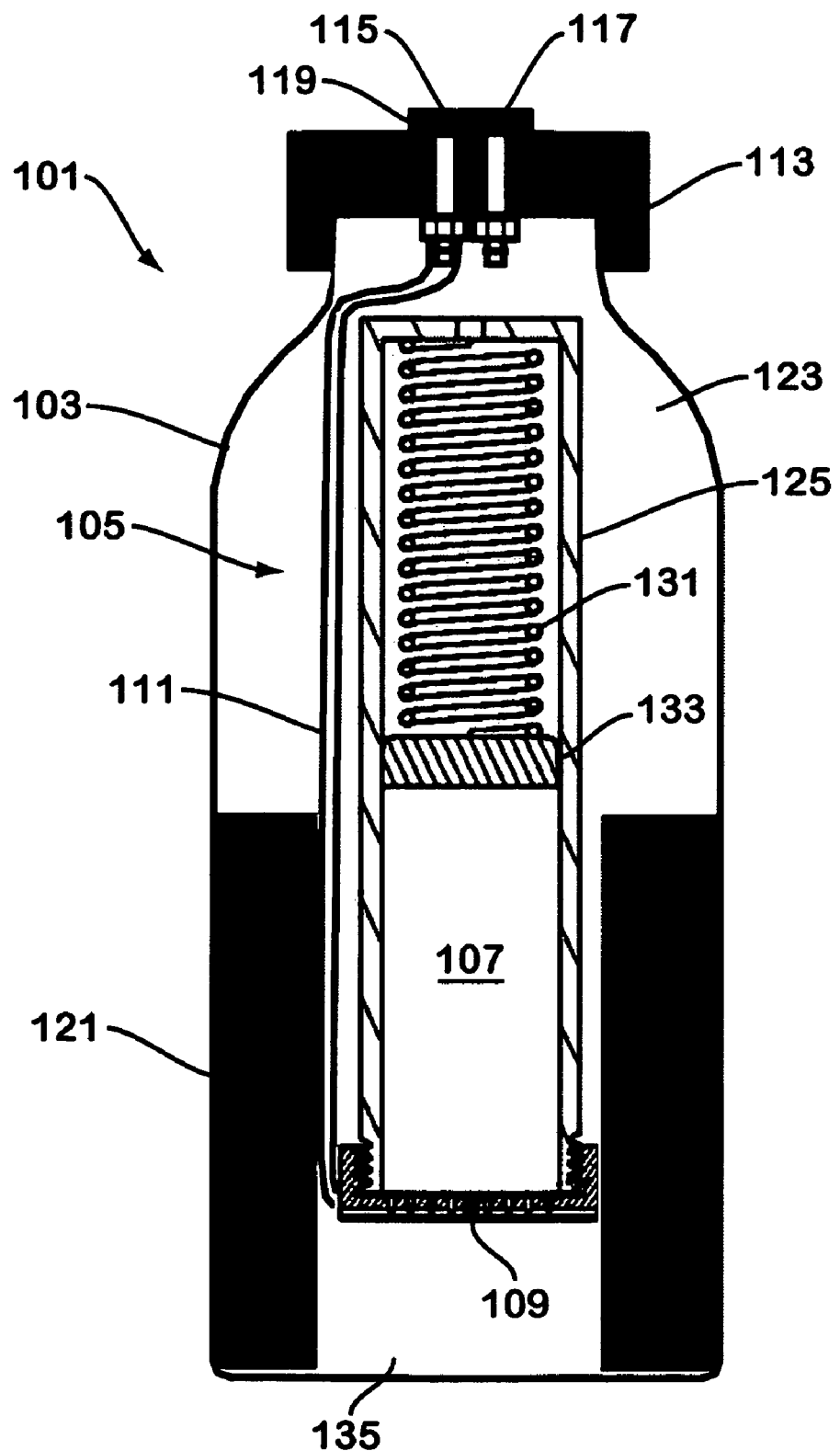
FIG. 1 is an illustration of a first embodiment, partially in section, of a hydrogen generator made in accordance with the teachings herein.
Figure 2:
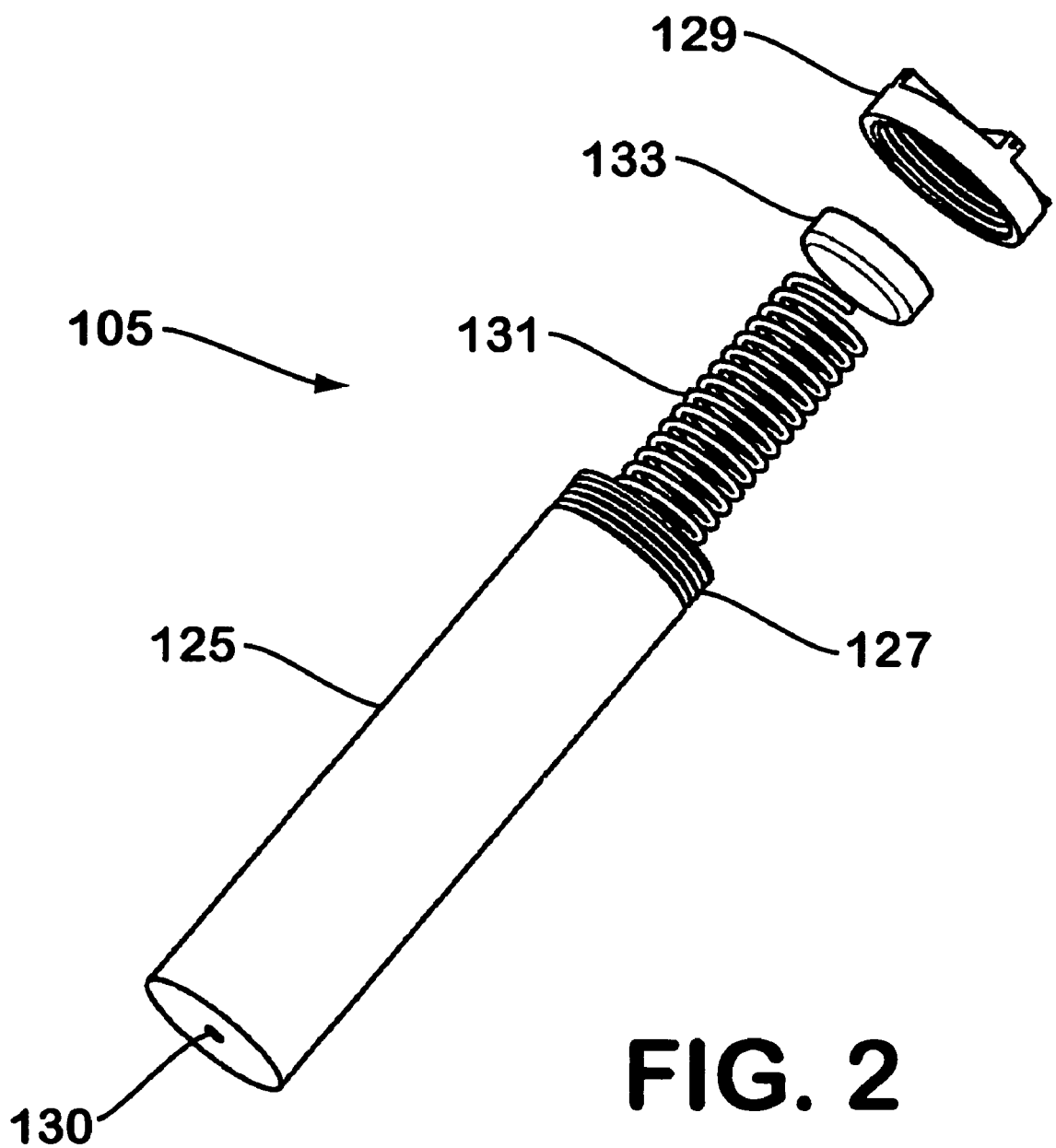
FIG. 2 is an illustration showing the hydride dispenser of the hydrogen generator of FIG. 1 in greater detail.

The devices and methodologies disclosed herein may be further understood with reference to the first particular, non-limiting embodiment of the hydrogen generator illustrated in FIGS. 1-2. The hydrogen generator 101 depicted therein comprises an aluminum housing 103 which is cylindrical in shape. A spring-loaded dispenser 105 is disposed within the housing 103, and is charged with a hydrogen-containing material 107, such as a hydride, borohydride, or borane, that is capable of undergoing a reaction to evolve hydrogen gas. This material may be present as a powder or in granular form, but is preferably present as a compressed rod of hydrogen-containing material that is complimentary in shape to the interior of the dispenser 105. In some variations of this embodiment, the rod may have a diameter somewhat less than the interior diameter of the dispenser to permit the ready egress of hydrogen gas therethrough.

A reactant interface 109 is provided which is in communication with a water delivery tube 111. The reactant interface 109 is porous and is preferably sufficiently hydrophilic so as to provide a wicking action or capillary action which serves to spread the water across the interface so that it can react with the hydrogen-containing material 107. The water delivery tube is in communication with a water reservoir (not shown). The flow of water from the reservoir into the tube may be controlled by valves, pumps, circuitry, chips, and other such means as are known to the art.

The housing 103 is provided with a cap 113 that is equipped with a water inlet port 115 and a hydrogen outlet port 117. A self-sealing septum 119 is provided to ensure a gas impermeable seal around a tube or needle inserted into the water inlet port 115 or the hydrogen outlet port 117. The water delivery tube 111 is in open communication with the water inlet port 115. Similarly, the hydrogen outlet port 117 is in open communication with the reactant interface 109 by way of polymeric foam 121, which is preferably an open-celled polymeric foam, and/or by way of an aperture 130 provided in one end of the dispenser 105.

The dispenser 105 is shown in greater detail in FIG. 2. It consists of a hollow cylinder 125 or sleeve which is provided on one end with a grooved surface 127 that threadingly engages a complementarily threaded cap 129. The threaded cap 129 contains the reactant interface 109. The cylinder 125 is provided on one end with an aperture 130. This aperture ensures that the pressure inside of the cylinder 125 is equal to the pressure inside of the housing 103, and also provides a point of egress for hydrogen gas that accumulates inside of the dispenser. In some embodiments, the aperture 130 may be connected to the hydrogen outlet port 117 by way of a tube or other conduit.

The hydrogen-containing material 107 is disposed within the dispenser 105. The hydrogen-containing material 107 may have a coating of plastic, rubber, grease, or oil to protect and/or to lubricate the circumferential surface of the rod. A compression spring 131 is disposed within the cylinder 125 and is equipped on one end with a plug 133 that acts as an interface between the spring 131 and the hydrogen-containing material 107 and that pressingly engages the hydrogen-containing material 107. When a new, full-sized rod 107 of the hydrogen-containing material is placed inside of the dispenser and the cap 129 is engaged, the spring 131 is compressed within the cylinder 125, and exerts a compressive force against the rod of hydrogen-containing material 107 by way of the plug 133.

In one particularly preferred embodiment, the rod of hydrogen-containing material 107 comprises a mixture of solid sodium borohydride ($NaBH_4$) with an anhydrous cobalt chloride catalyst ($CoCl_2$). Such a rod may be made by grinding and milling together the hydrogen-containing material and catalyst in dry powder form, preferably in a desiccated, inert atmosphere. In a typical embodiment based on the aforementioned materials, the catalyst is present at about 10% by weight, based on the total weight of the solid hydrogen-containing material mixture, although it will be appreciated that various other catalyst loadings and catalyst materials may be used. The powder mixture is then pressed into a cylindrical rod using a hydraulic press and a cylindrical pellet die (see FIG. 8). Of course, various dies may be used to impart various shapes to the rod as required to accommodate different housing designs or end uses.

The addition of water to the hydrogen-containing material results in the generation of hydrogen per EQUATION 1:

$$NaBH_4 + 2H_2O \leftrightarrow NaBO_2 + 4H_2 \quad \text{(EQUATION 1)}$$

The products of the reaction are hydrogen gas and sodium borate. Although anhydrous sodium borate is a solid at room temperature, the sodium borate product typically exists in various hydration states, depending on temperature. Under normal reaction conditions, these byproducts exist as a mud-like mass which may be pressed through a porous medium of sufficient pore size.

In use, when a demand for hydrogen gas exists, water is pumped or metered into water delivery tube 111 by way of water inlet port 115. As the water reaches the reactant interface 109, it wicks across the interface 109 and reacts with the surface of the hydrogen-containing material 107 that is pressed against the interface 109, thereby generating hydrogen gas. The hydrogen gas evolved by this reaction permeates the open-celled polymeric foam 121 and passes into a space or reservoir 123 that is provided within the housing 103 and that is in open communication with a hydrogen outlet port 117. Various valves, regulators and other devices as are known to the art may be utilized to control the egress of hydrogen gas out of the hydrogen outlet port 117. The reservoir 123 is typically of sufficient size to accommodate a substantial volume and pressure of hydrogen gas so that the supply of hydrogen gas will not be interrupted during use.

As hydrogen gas is evolved, a film of reactant byproduct (which, as noted above, consists principally of sodium borate ($NaBO_2$) and its various hydrates) is formed across the face of the hydrogen-containing material 107 that is compressively engaged with the reaction interface 109. In contrast to the hydrogen-containing material 107, which has been compressed under pressure into a solid, hardened mass, the film of reactant byproduct is in the form of a mud-like mass. Hence, the compressive force provided by the spring 131 against the hydrogen-containing material 107 has the effect of pushing this byproduct across the porous reaction interface 109, thus removing it from the reaction zone and exposing a fresh, unreacted surface of the hydrogen-containing material 107 to the water wicking across the reaction interface 109. As a result, by the time the hydrogen generator 101 has been spent, virtually the entire mass of hydrogen-containing material 107 is reacted, without the need for grinding, mechanical agitation, or other processing steps.

It will be appreciated from the foregoing description that the hydrogen generator operates at a very high level of efficiency to optimize the amount of hydrogen produced per unit hydrogen-containing material. Moreover, the hydrogen generator 101 operates silently, and is thus suitable for use in laptop computers and in other applications where noise is undesirable or unacceptable. Also, aside from the spring 131, the hydrogen generator has no moving parts.

Another notable feature of the hydrogen generator 101 depicted in FIGS. 1 and 2 is the polymeric foam 121. As previously mentioned, this foam preferably has an open-celled morphology. This foam, which is preferably a polyurethane foam, provides an open, yet tortuous, pathway between the reaction interface 109 and the hydrogen outlet port 117. The provision of such a tortuous pathway serves to contain the relatively viscous reactant byproducts within a lower reservoir 135 provided in the bottom of the hydrogen generator, without significantly interfering with the egress of hydrogen gas. Consequently, these materials will not leak out of the generator 101, even if it is turned upside down.

The provision of a tortuous pathway also provides a large surface area over which the moisture content of the hydrogen gas stream can condense, along with any residual reactant byproduct. Consequently, the hydrogen gas exiting the hydrogen outlet port has an acceptably low moisture content, and is relatively pure. This moisture content may be further reduced through the provision of a desiccant within or above the polymeric foam. Possible desiccants include, for example, calcium chloride, molecular sieves, bentonite clay, starch, or other hygroscopic materials that are commonly used as desiccating agents. The desiccant may also include a hydride, borohydride, or borate, either in anhydrous form or in any of various hydration states. By contrast, many prior art hydrogen generators generate a relatively wet hydrogen gas stream, which results in water condensation problems in the valves, tubing and pumps located downstream of the hydrogen generator, and which may also result in contamination of these elements by the caustic or corrosive reaction byproducts of the hydrolysis reaction.

Figure 3:
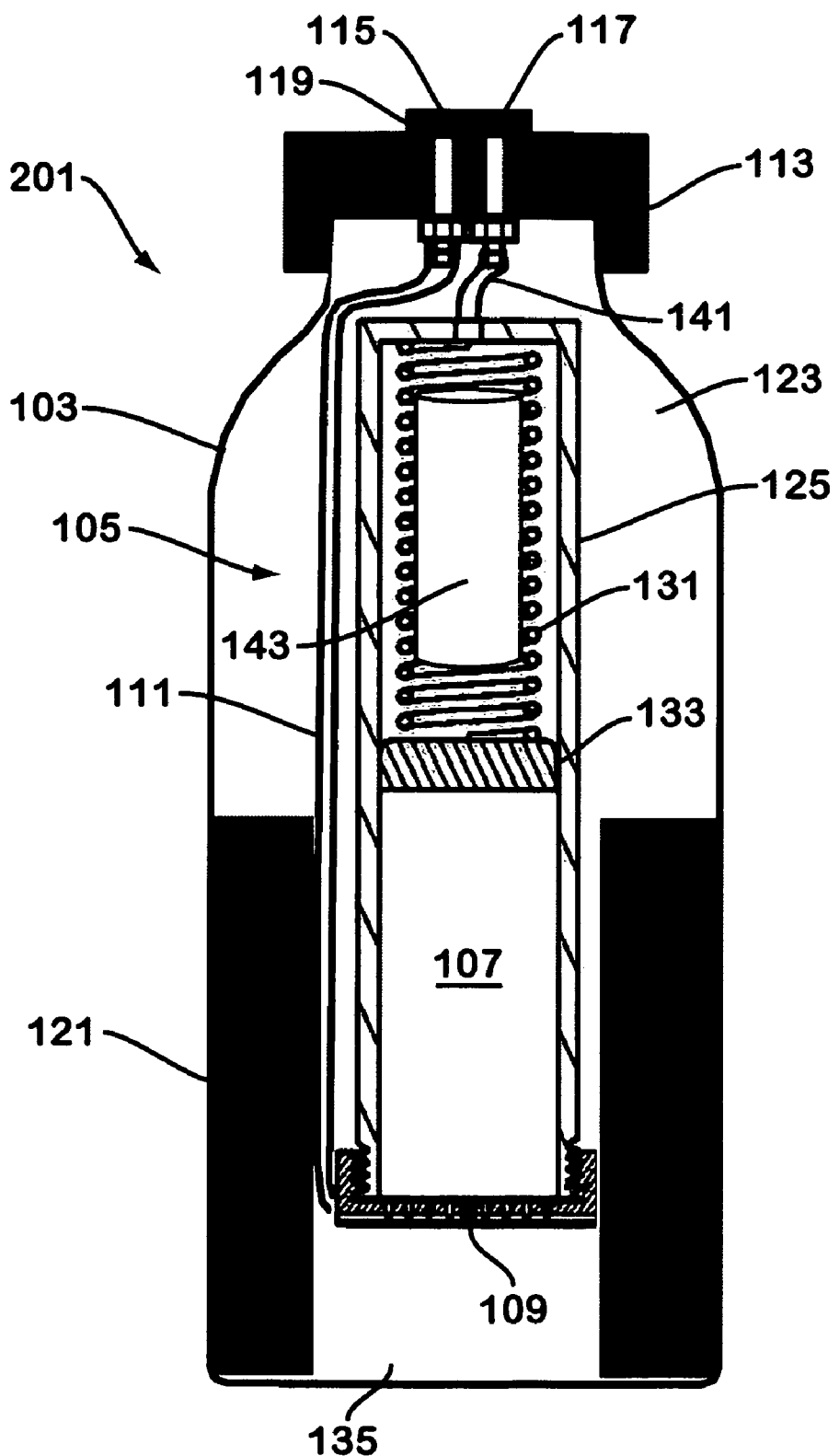
FIG. 3 is an illustration of a second embodiment, partially in section, of a hydrogen generator made in accordance with the teachings herein.

FIG. 3 illustrates a second embodiment of a hydrogen generator made in accordance with the teachings herein. The hydrogen generator 201 of this embodiment is similar in most respects to the embodiment depicted in FIGS. 1-2. However, in this embodiment, the hydrogen gas evolved from the sodium borohydride pellet 107 is collected through the aperture 130 (see FIG. 2) provided in one end of the dispenser 105. In the particular embodiment depicted, a tube 141 is provided which connects aperture 130 to hydrogen outlet port 117 although, in some variations of this embodiment, the tube 141 may be omitted.

A further difference between the embodiment of FIG. 3 and the embodiment depicted in FIGS. 1-2 is the provision of a desiccating agent 143 in the spring-loaded portion of the dispenser. The desiccating agent 143 is disposed in the path of egress of the hydrogen gas as it flows from the reaction interface 109 and through the interior of the cylinder. 125 (see FIG. 2) of the hydride dispenser 105. Hence, the hydrogen gas exiting the hydrogen outlet has a very low moisture content. As previously noted, this is desirable to avoid water condensation within the tubes, valves, conduits, motors, and other components of a device operating off of the hydrogen generator.

The desiccating agent 143 may take a variety of forms. For example, it may be present as a powder, in granular form, as a foam, or as spheres. It may also be in the form of a capsule or pellet. In the latter case, the capsule or pellet may be sized to fit inside of the coils of the spring 131 so that it will not interfere with the mechanical operation of the dispenser.

Various materials may be used as the desiccating agent 143. These include such materials as calcium chloride, various water-swellable or water adsorbent clays (such as, for example, bentonite clay), silica gel, calcium oxide, calcium sulfate, and molecular sieves. In some embodiments, anhydrous hydrides, borohydrides or boranes, or the hydrolysis byproducts of these materials, such as sodium or lithium borate, may also be used as the desiccant. The hydrolysis byproducts are preferably anhydrous, but may also be in varying hydration states.

Figure 4:
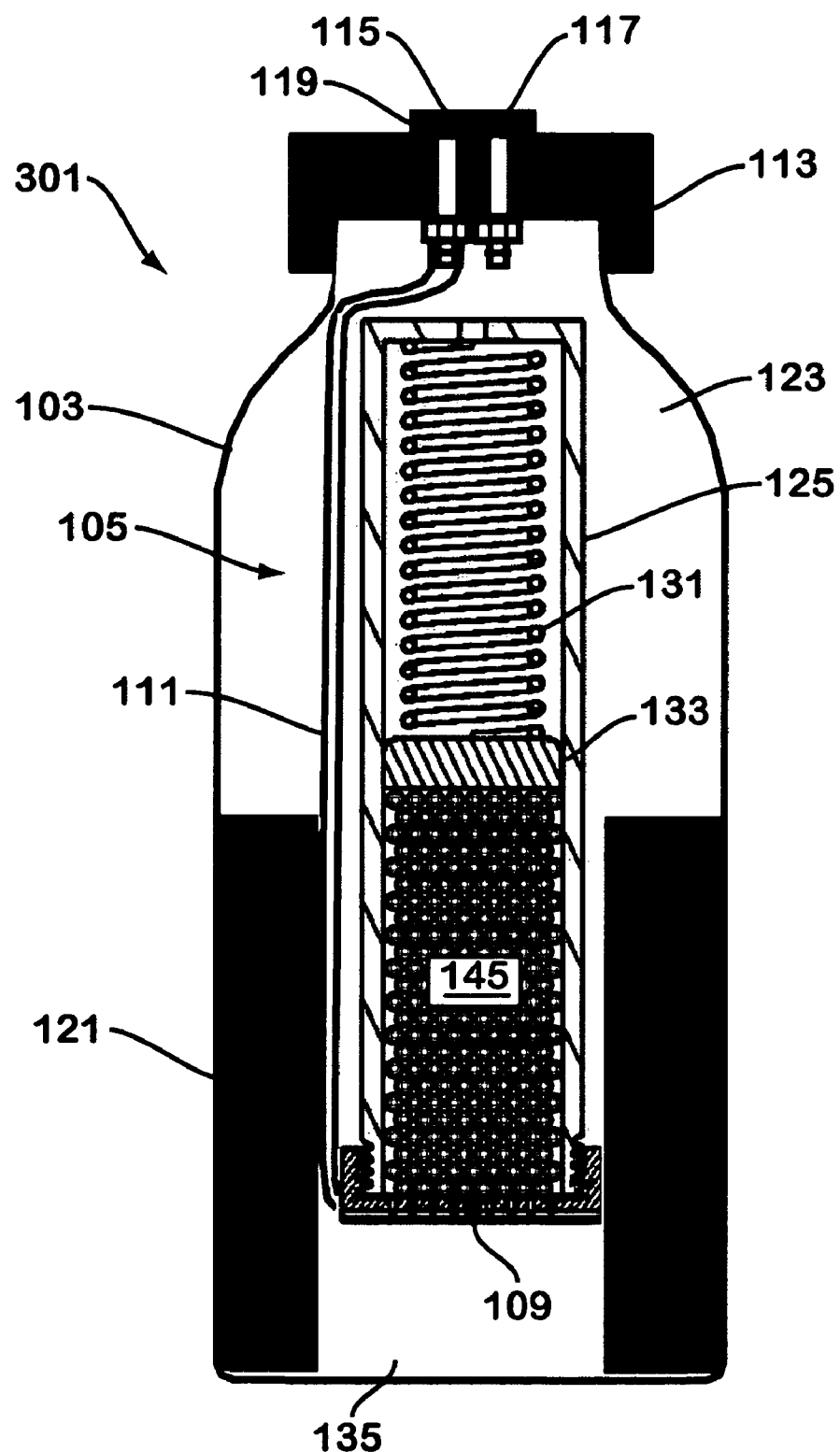
FIG. 4 is an illustration of a third embodiment of a hydrogen generator made in accordance with the teachings herein.

FIG. 4 illustrates a third embodiment of a hydrogen generator made in accordance with the teachings herein. The hydrogen generator 301 of this embodiment is similar in most respects to the embodiment depicted in FIGS. 1-2. However, in the hydrogen generator of FIG. 3, the hydrogen-containing material is provided in the form of a bed 145 of particles. In the particular embodiment depicted, the particles are shown as being spherical particles of approximately equal dimensions. However, it will be appreciated that the particles may be of other shapes or mixtures of shapes, and may have various size distributions or size gradients.

One of the advantages of the use of a bed 145 of particles in the hydrogen generator 301 depicted in FIG. 4 is that the bed 145 contains a significant volume of empty space in the form of interstitial cavities that are present between the component particles. During operation, this space serves as a reservoir for generated hydrogen gas. Consequently, the overall dimensions of the hydrogen generator may be reduced, since part or all of the functionality of reservoir 123 is now being provided by the hydrogen-containing material itself.

It will also be appreciated that the hydrogen-containing material may be provided in the form of a foam, a cellular solid, or in other continuous or semi-continuous morphologies that have sufficient porosity to accommodate a significant volume of hydrogen gas or to allow hydrogen gas to permeate therethrough. Such morphologies may be generated, for example, by saturating the hydrogen-containing material with a suitable gas while the hydrogen-containing material is in a liquid or softened state and under pressure, and then reducing the pressure to cause effervescence, preferably while simultaneously cooling the hydrogen-containing material. These morphologies may also be created by mixing or milling the hydrogen-containing material with a material that can undergo a chemical, thermal or photolytic decomposition reaction to generate a suitable gas, preferably while the hydrogen-containing material is in a liquid or softened state.

Figure 5:
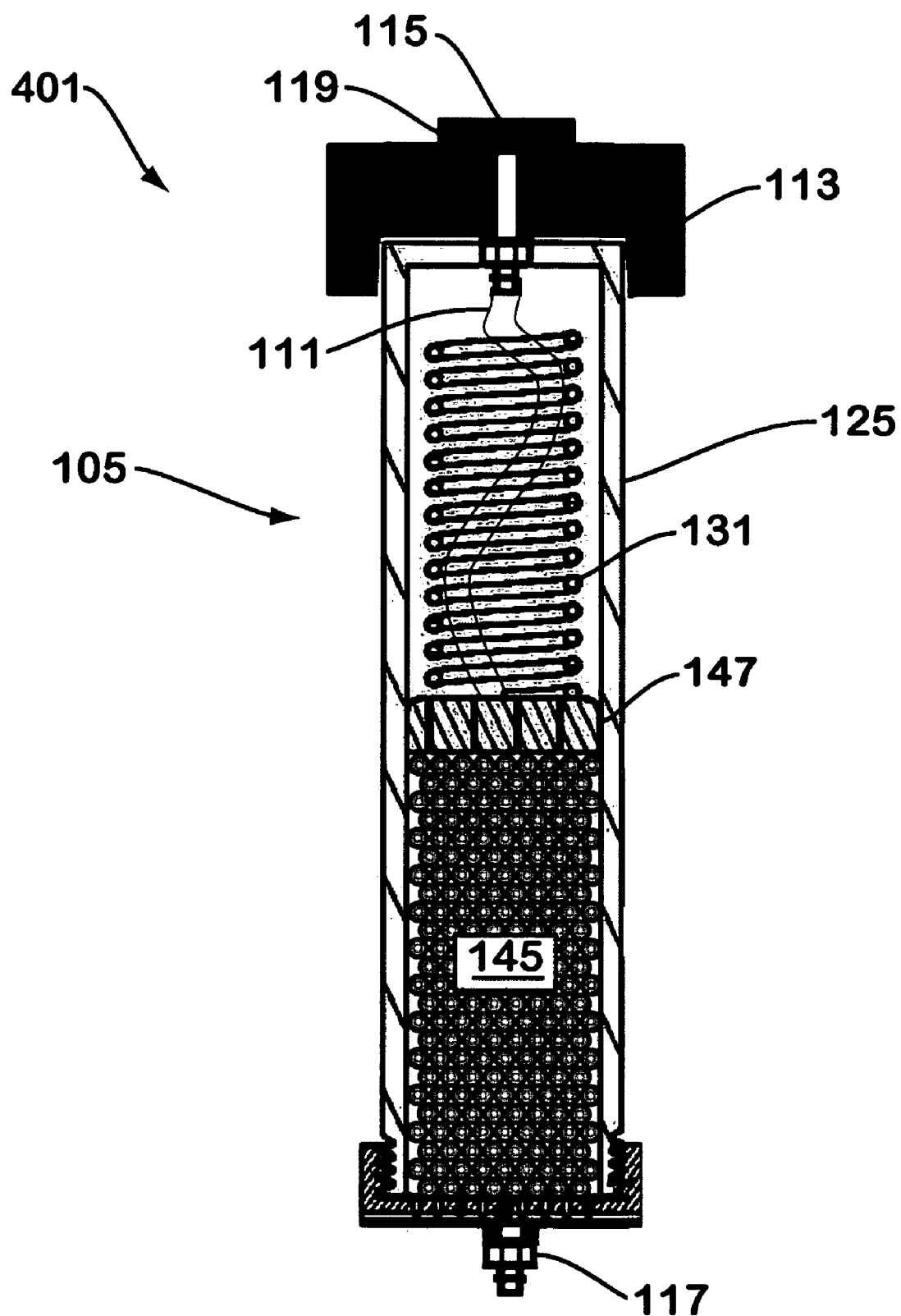
FIG. 5 is an illustration of a fourth embodiment of a hydrogen generator made in accordance with the teachings herein.

FIG. 5 depicts a fourth embodiment of a hydrogen generator made in accordance with the teachings herein. In the hydrogen generator 401 of FIG. 5, the storage volume provided by the interstitial cavities is sufficiently large that the need for a housing external to the dispenser is entirely eliminated (put another way, the external housing is merged with the dispenser). In the embodiment depicted in FIG. 5, the plug 147 is sufficiently porous to allow the egress of spent hydrogen-containing material (e.g., hydrated sodium borate) therethrough, so that it can collect in the space occupied by the spring 131. The water delivery tube 111 is in open communication with at least the surface of the plug 147 that is in contact with the hydrogen-containing material 145 (the water delivery tube 111 is preferably coiled to permit free extension of the spring 131). Preferably, this surface is adapted to serve as a wicking element for water applied to it. In some embodiments, the opposing surface of the plug 147 may be provided with a hydrophobic material so that the spent hydrogen-containing material stored on that side of the plug will not adsorb water from the plug. This reduces the need for a stoichiometric excess of water, and thus reduces the weight penalty associated with the system.

One of the advantages of the hydrogen generator 401 of FIG. 5 is that the hydrogen outlet port 117 is disposed on the opposite side of the bed 145 from the plug 147. Consequently, hydrogen gas generated at the plug 147 must traverse the bed 145 in order to reach the hydrogen outlet port 117. Since many hydrides, borohydrides and boranes are good or excellent desiccating agents, this ensures that the hydrogen gas stream emitted from the hydrogen outlet port 117 is substantially moisture free. Hence, the design of the hydrogen generator 401 of FIG. 5 provides additional protection against the condensation problems previously noted. This is especially true when this design is implemented with a bed 145 of particles of the hydrogen-containing material as shown, since the increased surface area encountered by the hydrogen gas offers a greater opportunity for the desiccation reaction to occur.

Figure 6:
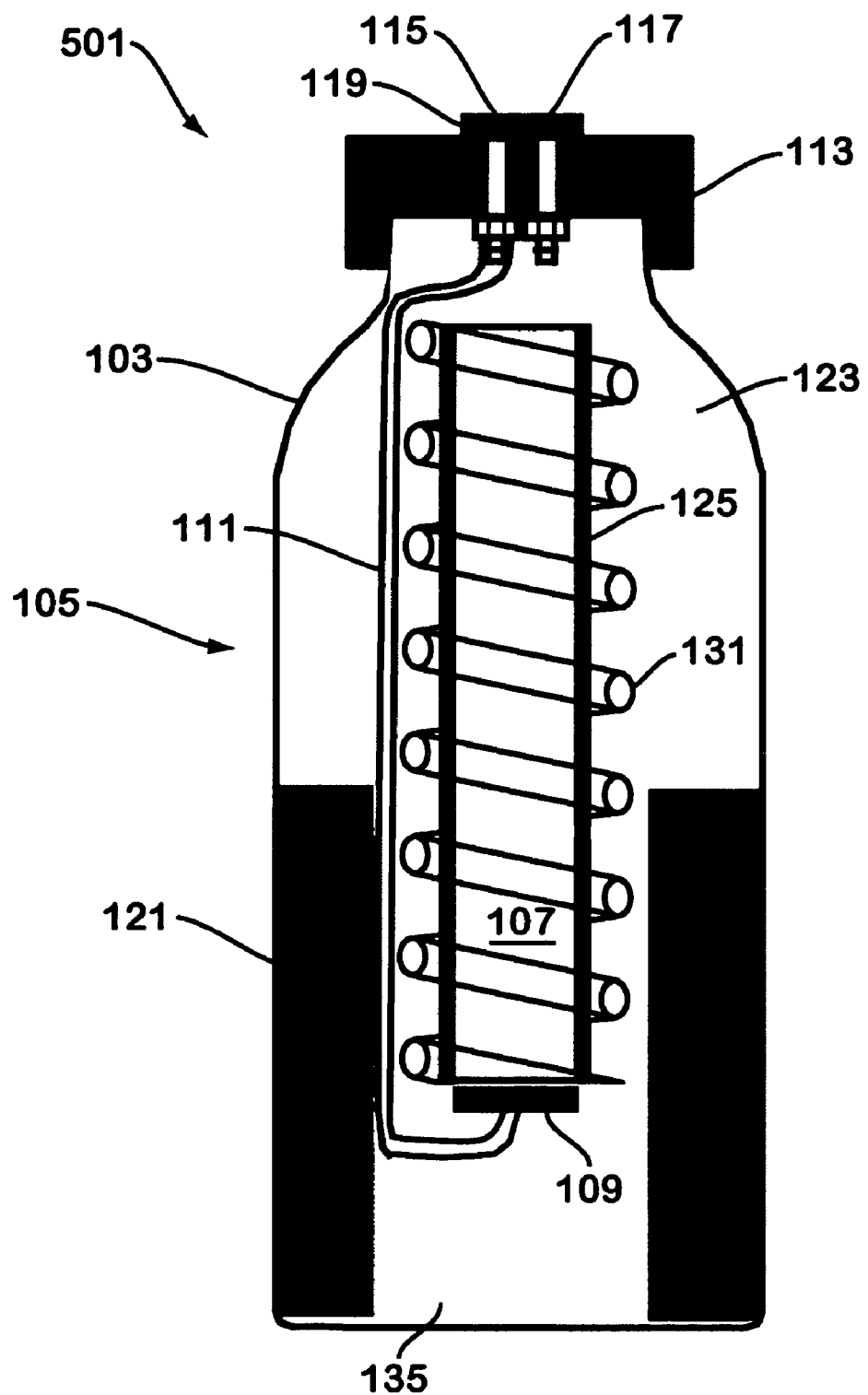
FIG. 6 is an illustration of a fifth embodiment of a hydrogen generator made in accordance with the teachings herein.

FIG. 6 illustrates a fifth embodiment of a hydrogen generator made in accordance with the teachings herein. The hydrogen generator 501 of this embodiment is similar in most respects to the embodiment depicted in FIGS. 1-2. However, unlike the embodiment of FIGS. 1-2 which utilizes a spring internal to the hydride dispenser to compress the hydride pellet against the reaction interface through expansion of the spring, in this embodiment, an extension spring 131 is provided on the exterior of the pellet 107. The extension spring 131 is in an extended configuration and is attached on one end to the reaction interface and on the other end to the end of the hydride pellet 107 most distant from the reaction interface 109. Hence, the extension spring 131 acts to compress the reaction interface 109 against the hydride pellet 107.

Figure 7:
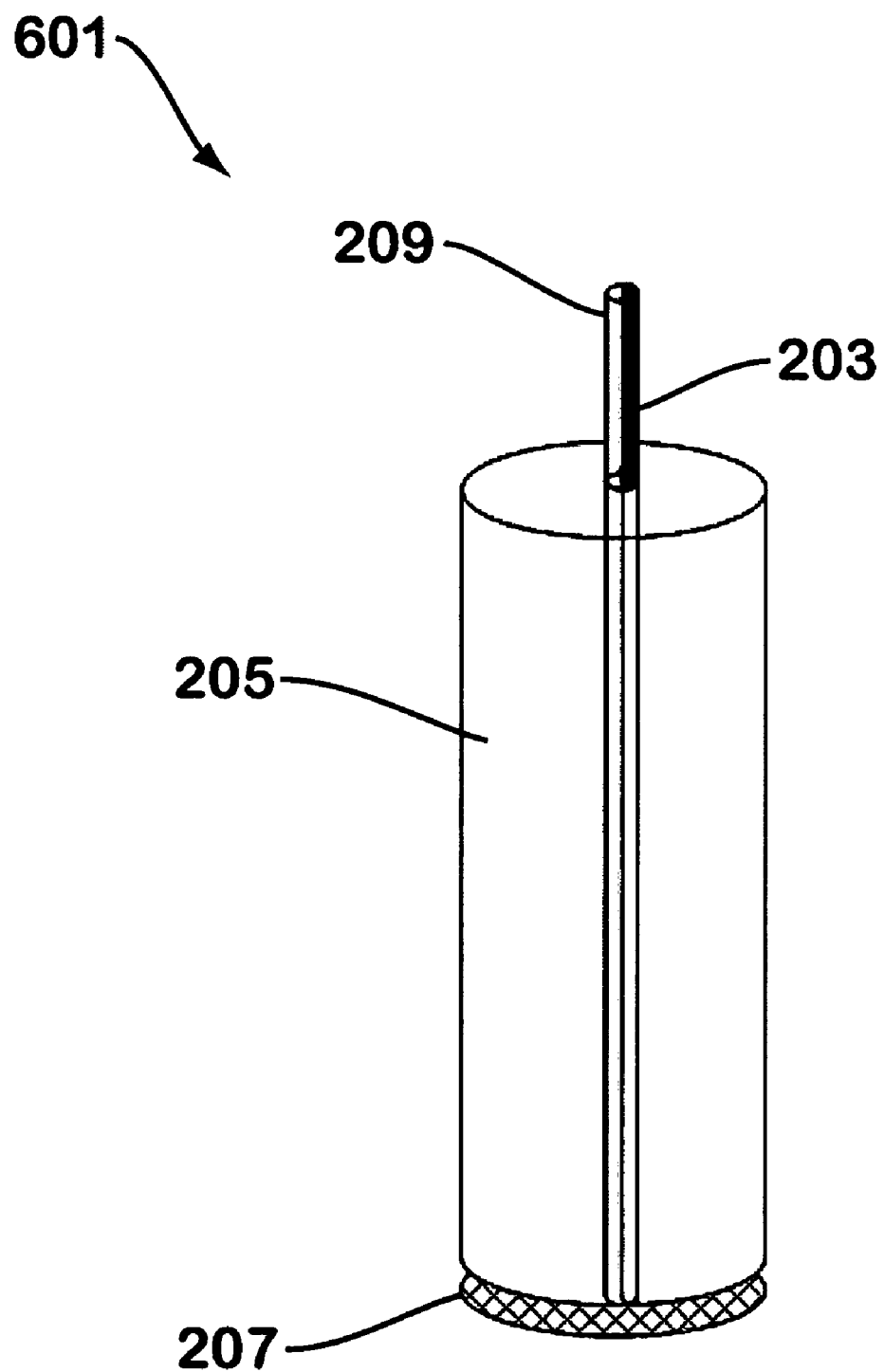
FIG. 7 is an illustration of a sixth embodiment of a hydrogen generator made in accordance with the teachings herein.

FIG. 7 depicts a further embodiment of the hydrogen dispensers disclosed herein. In this embodiment, the dispensing mechanism 601 includes an elastic band 203, string, cord, thread, or rope that is threaded through the longitudinal axis of a cylindrical rod 205 of the hydrogen-containing material. The elastic band 203 is attached on a first end to a water wicking screen 207, mesh, frit, or other device that is adapted to disperse water over one end of the hydrogen-containing material, and extends through the interior of the rod 205 to the opposing end. A suitable hole or conduit may be provided in the rod for this purpose. The elastic band 203 is attached on the second end to a water dispensing tube 209 or hose. The elastic band serves to keep the water dispensing device held tightly against the rod, and also serves to compress the screen 207 against the surface of the hydrogen-containing material 205. As the hydrogen-containing material 205 is consumed, the by-products of the hydrolysis reaction are pushed out of the reaction zone, and the water dispensing device is maintained in close contact with the unspent hydrogen-containing material. This entire dispensing mechanism 601 may be placed into a canister or cylinder, as described in the previous embodiments, and may also be provided with suitable means of supplying water and removing hydrogen gas.

Figure 8:
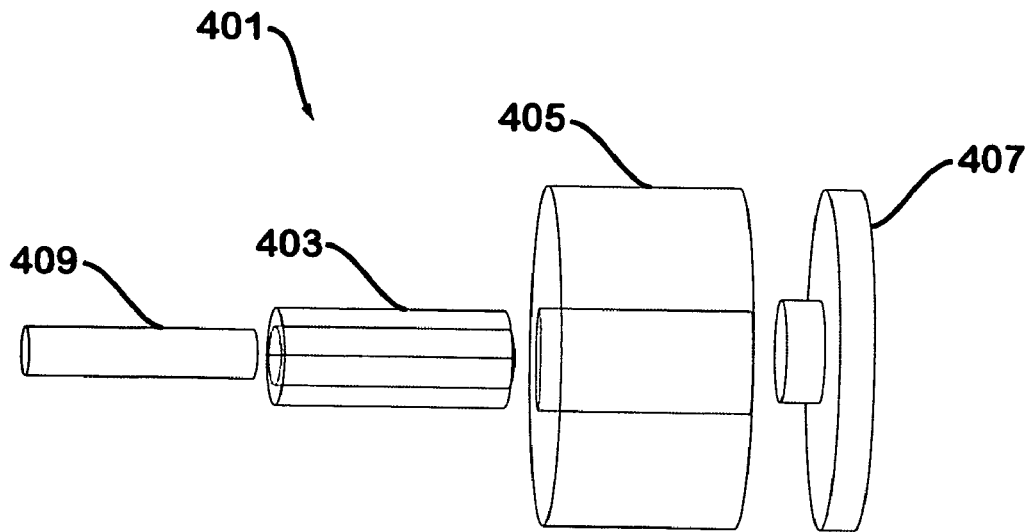
FIG. 8 is an illustration of a pneumatic press mold suitable for use in making hydride pellets for use in the devices described herein.

FIG. 8 illustrates a casting device of the type that may be used to generate hydride pellets of the type described herein. The casting device 401 comprises a die 403 whose interior defines the shape of the pellet, and whose exterior fits snugly inside a die housing 405. The die housing 405 is provided on one end with a plug 407, and on the other end with a pneumatically or hydraulically driven pin 409 which is complimentary in shape to the interior of the die 403. In use, the die 403 is loaded with the hydrogen-containing material, preferably in powder form, and sufficient pressure is applied to the pin 409 to compress the hydrogen-containing material into a congruent mass which assumes the shape of the die 403. It will be appreciated that, while the die 403 of FIG. 8 is annular in shape, dies of various other shapes may be employed to produce pellets having a variety of geometries.

Figure 9:
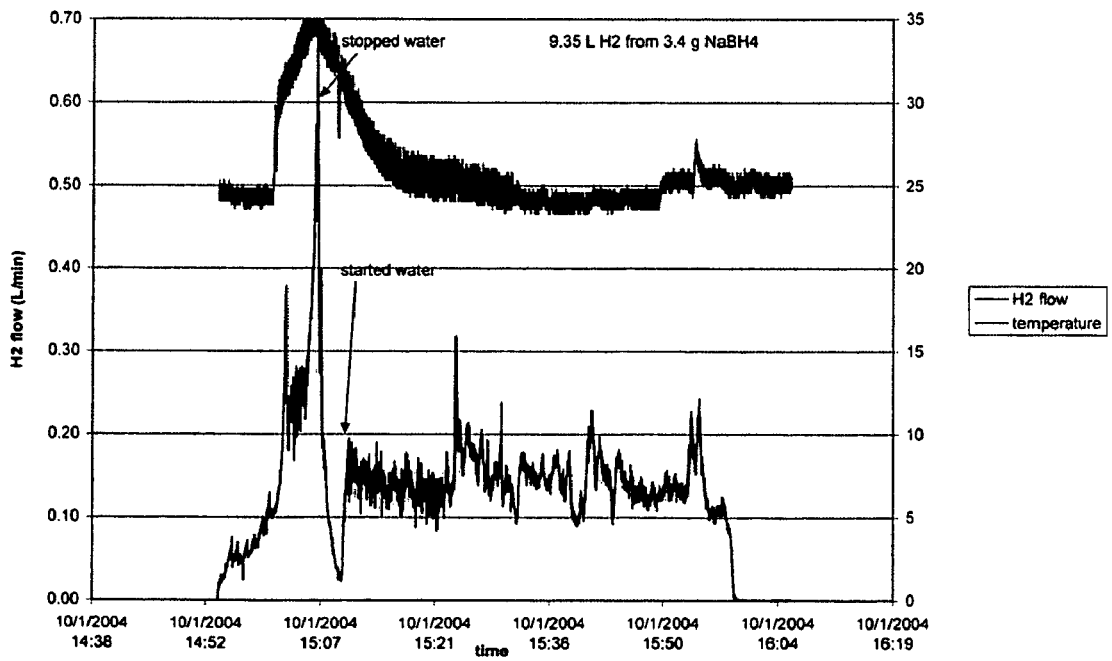
FIG. 9 is a graph showing hydrogen flow as a function of time and temperature in a hydrogen generator made in accordance with the teachings herein.

FIG. 9 illustrates the ability of hydrogen generators of the type described herein to produce hydrogen on demand. A generator of the type depicted in FIGS. 1-2 was loaded with two sodium borohydrate pellets which contained 1% by volume of a wicking agent. The graph shows hydrogen flow (i.e., hydrogen evolution) as a function of time and temperature for a hydrogen generator. As seen in the graph, a hydrogen flow rate of 0.5 L/min was observed only 14 seconds after the flow of water in the water delivery tube commenced. Both hydrogen flow and temperature peaked 29 seconds after the flow of water in the water delivery tube commenced. The peak hydrogen flow was about 0.70 L/min, and the peak temperature was about 35° C. At that point, the flow of water was temporarily stopped, but was quickly resumed. From that point on, hydrogen evolution continued at a steady state of approximately 0.5 L/min for about the next minute, and the temperature remained relatively steady within the range of 5-10° C.

In many of the embodiments of the hydrogen generators described herein, one or more springs are employed to exert a pressure on the pellets or granules of hydrogen-containing material, so as to force the reaction byproducts out of the reaction zone. However, it will be appreciated that various other means or mechanisms could also be used for this purpose, either in lieu of, or in addition to, the use of springs. For example, pneumatic or hydraulic pressure, in the form of, for example, one or more pneumatically or hydraulically driven pistons, may be utilized to apply pressure to the pellets or granules to achieve a similar effect. Various electrically driven motors may also be used.

Alternatively, one or more pressurized, expandable bladders may also be used for this purpose. These bladders may be pre-charged with a predetermined amount of gas, or may contain materials which undergo a chemical reaction to generate gas under similar conditions as the materials used to generate hydrogen gas within the generator. Various water-swellable materials or polymers may also be used for this purpose. Materials having high coefficients of thermal expansion may also be used for this purpose.

Figure 10:
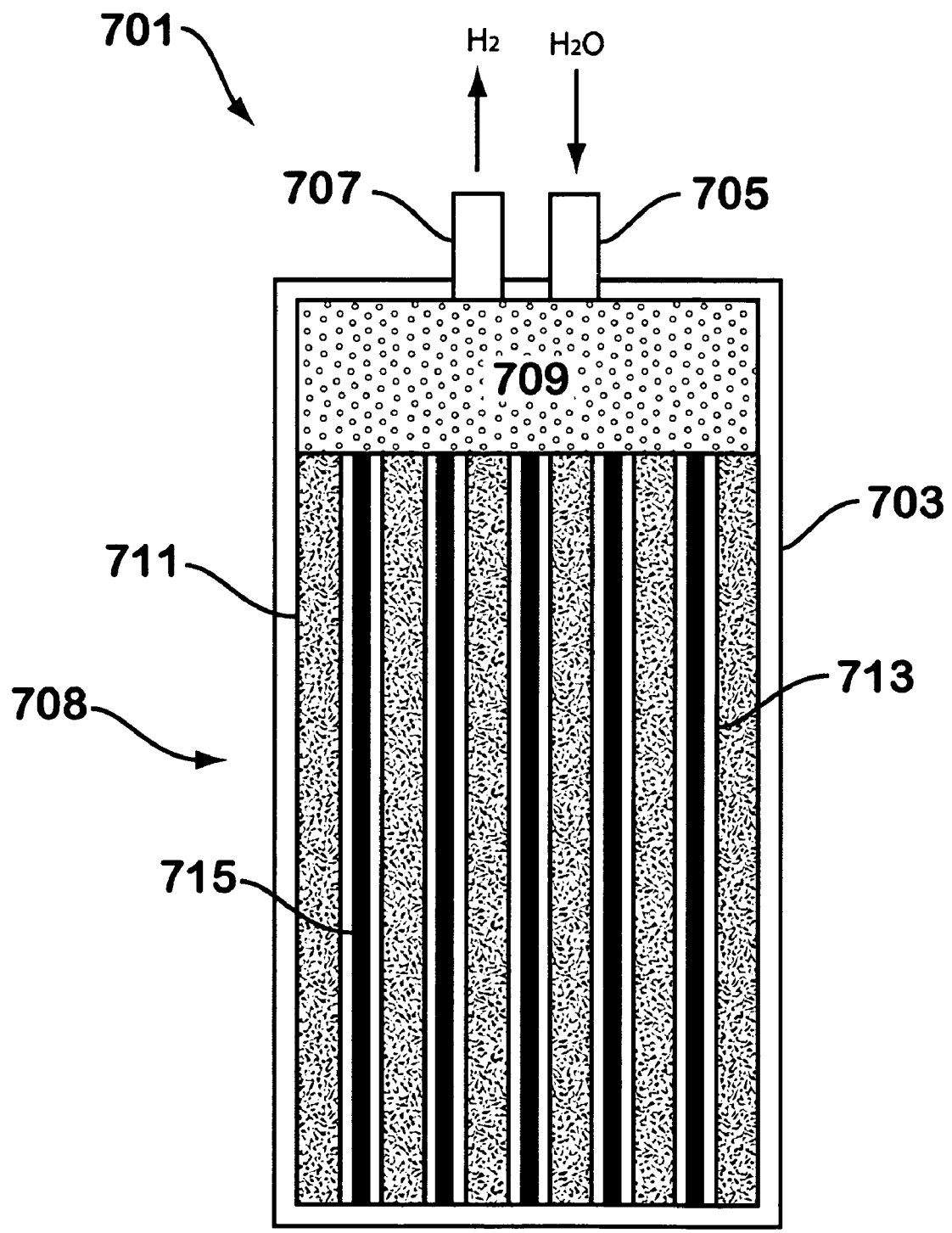
FIG. 10 is an illustration of a seventh embodiment of a hydrogen generator made in accordance with the teachings herein.

An example of the latter type of pressure generating means is illustrated in the embodiment of the hydrogen generator 701 depicted in FIG. 10. This hydrogen generator 701 comprises a housing 703 equipped with a water inlet 705 and a hydrogen gas outlet 707. The water inlet 705 is in open communication with a porous pad 709 that is permeable by both water and hydrogen gas.

The hydrogen generating portion of the hydrogen generator 701 includes a reaction zone 708 where hydrogen gas is evolved and which comprises a series of alternating regions of a water- and gas-permeable foam 711 or other porous material, and a hydrogen-containing material 713. As with the other hydrogen generators described herein, the hydrogen-containing material 713 preferably comprises a hydride, a borohydride and/or a borane. Within the hydrogen-containing material 713 is disposed an expansion material 715, which may be present as a rod or layer or, in some cases, as an admixture or component of the hydrogen-containing material.

In one embodiment of the hydrogen generator 701, the expansion material 715 comprises a material that has a large coefficient of thermal expansion. Such a material may be, for example, Zn, Pb, Mg, Al, or alloys or mixtures of the foregoing. If desired, the hydrogen generator may be assembled under cooled conditions to increase the pressure applied by the expansion material 715 to the hydrogen-containing material 707. While the hydrogen generator is in use, this material exerts pressure on the hydrogen-containing material 713, thus pressing it against the foam 717. The foam 717 is preferably a rigid, non-compressible foam that is readily permeable by water and hydrogen gas. Such a foam may comprise, for example, cellular concrete or various foamed metals (in the case of the later, the foamed metals may be coated, as necessary, with a material that renders them neutral to the environment within the hydrogen generator). In some embodiments, a bed of (preferably packed) granules may be used in please of the foam.

During operation, water enters the foam 717 and wicks through the device to come into contact with the hydrogen-containing material 707. The hydrogen-containing material reacts with the water to generate hydrogen gas and reaction byproduct. The hydrogen gas flows through the foam 711 and pad 709 and out through the hydrogen outlet 707. Preferably, the foam 711 and/or the pad 709 has sufficient porosity such that, when the hydrogen outlet is not open, it can store a substantial amount of hydrogen gas. The softened reaction byproduct, on the other hand, is forced by the expansion material 715 into the pores of the foam 711, thus removing it from the foam/hydrogen-containing material interface where the hydrogen generation reaction is occurring.

In another embodiment of the hydrogen generator depicted in FIG. 10, the expansion material 715 comprises a water-swellable or fluid-swellable material or polymer. In some cases, this material may be formulated with a wicking agent. As water contacts the expansion material 715, either at an interface between this material and the pad 709 or by way of hydrogen-containing material 713, the expansion material swells to press the hydrogen-containing material 713 against the foam 711. As with the previous embodiment, this has the effect of moving reaction byproduct into the foam and out of the reaction zone so that it will not interfere with the hydrogen evolution reaction.

In still other embodiments, expansion material 715 may be a material that undergoes expansion through the application of a voltage or a magnetic field. The expansion material may also be a liquid that does not react with the hydrogen-containing material, but that applies sufficient hydrostatic pressure to the hydrogen-containing material to move the reaction byproducts out of the reaction zone.

Figure 11:
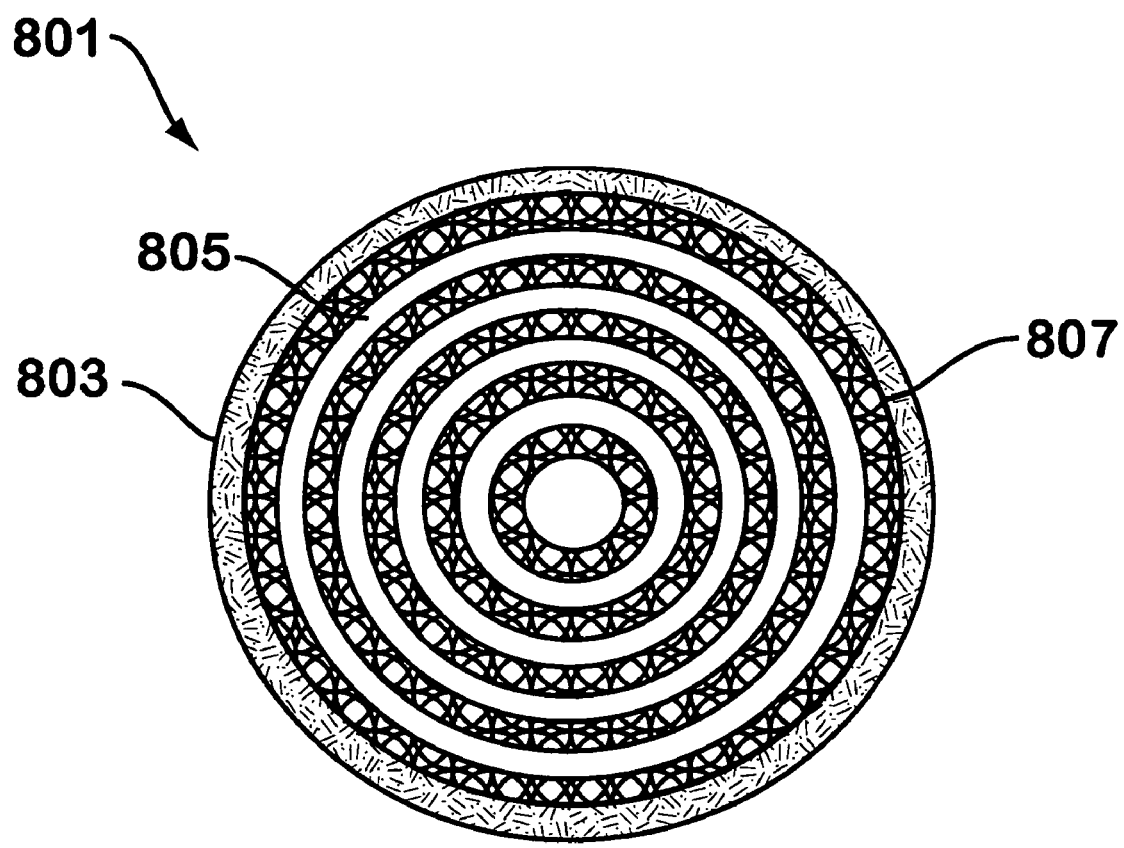
FIG. 11 is an illustration of an embodiment of a reaction zone in a hydrogen generator made in accordance with the teachings herein.

FIG. 11 depicts a cross-sectional view of the reaction zone of a hydrogen generator 801 which is similar in many respects to the hydrogen generator 701 of FIG. 10. The hydrogen generator 801 depicted in FIG. 11 comprises a housing 803 within which is contained concentric layers of a hydrogen-containing material 805 and a porous material 807. When water or another liquid reactant is applied to the porous material 807, it wicks through the porous material 807 and reacts with the adjacent layers of hydrogen-containing material 805 to generate hydrogen gas. The hydrogen gas permeates the porous material 807 and exits the generator through a suitable outlet.

The hydrogen generator 801 depicted in FIG. 11 has no distinct expansion material as in the hydrogen generator of FIG. 10, although this functionality may be provided in part or in whole by the porous material 807 and/or the hydrogen-containing material 805 itself. Thus, in some embodiments, the porous material itself acts as an expansion material (by undergoing thermal expansion, water-induced swelling, or the other types of expansion noted with respect to the previously described embodiment).

In other embodiments, the porous material 807 is relatively rigid, and the hydrogen-containing material 805 expands suitably during the reaction process such that the reaction byproducts are pushed out of the reaction zone. This process may be aided by packing or compressing the hydrogen-containing material suitably (e.g., so that there is a significant difference in density between the hydrogen-containing material and the reactant byproduct), by making the layers of hydrogen-containing material 805 sufficiently thin or the layers of porous material 807 sufficiently thick, or by other suitable means, including combinations of the foregoing.

It will be understood that the hydrogen generators of FIGS. 10 and 11 may be implemented in various forms and geometries. Thus, for example, while the hydrogen generator 801 of FIG. 11 features concentric layers of hydrogen-containing material 805 and porous material 807, it will be appreciated that these layers may be helical, which may facilitate assembly of the hydrogen generator by allowing these layers to be wound into a mass of the desired dimensions. Moreover, the relative dimensions of the component layers and materials may vary widely, and will typically be determined by product design considerations and materials properties. Also, these hydrogen generators may be cylindrical, rectangular, or have various other shapes.

1. Housing Geometries

The housings utilized in the hydrogen generators described herein may have various shapes. Preferably, these housings are cylindrical, due to the ability of such a geometry to readily accommodate the pressures that the casing may be subjected to as hydrogen gas is evolved and accumulates within the interior of the casing. However, it will be appreciated that various other geometries may also be utilized. For example, the outer casing may be spherical, rectangular, cubical, rhombohedral, ellipsoidal, or the like.

2. Housing Materials

Various materials may be used in the housings of the hydrogen generators described herein. Preferably, the housing comprises aluminum, due to the unique combination of strength, light weight, and relative chemical inertness. However, it will be appreciated that the housing could also be constructed from various other materials, including various metals (such as magnesium, tin, titanium, and their alloys) and various metal alloys, including steel. The housing may also comprise various polymeric materials, including polyethylene, polypropylene, PVC, nylon, graphite, and various glasses. If the housing comprises a metal such as aluminum, the interior of the housing is preferably coated with a protective layer of a suitable material, such as an epoxy resin, which is inert to the reactants and the products and byproducts of the hydrolysis reaction. The housing, or portions thereof, may also be thermally insulated.

3. Hydrides, Borohydrides and Boranes

Various hydrides, or combinations of hydrides, that produce hydrogen upon contacting water at temperatures that are desired within the hydrogen generator may be used in the devices and methodologies described herein. Salt-like and covalent hydrides of light metals, especially those metals found in Groups I and II, and even some metals found in Group III, of the Periodic Table are useful and include, for example, hydrides of lithium, sodium, potassium, rubidium, cesium, magnesium, beryllium, calcium, aluminum or combinations thereof. Preferred hydrides include, for example, borohydrides, alanates, or combinations thereof.

As shown in TABLE 1 and TABLE 2 below, the hydrides of many of the light metals appearing in the first, second and third groups of the periodic table contain a significant amount of hydrogen on a weight percent basis and release their hydrogen by a hydrolysis reaction upon the addition of water. The hydrolysis reactions that proceed to an oxide and hydrogen (see TABLE 2) provide the highest hydrogen yield, but may not be useful for generating hydrogen in a lightweight hydrogen generator that operates at ambient conditions because these reactions tend to proceed only at high temperatures. Therefore, the most useful reactions for a lightweight hydrogen generator that operates at ambient conditions are those reactions that proceed to hydrogen and a hydroxide. Both the salt-like hydrides and the covalent hydrides are useful compounds for hydrogen production because both proceed to yield the hydroxide and hydrogen.

TABLE 1

Hydrogen Content of Metal Hydrides

| | Wt % $H_2$ | | |
|---|---|---|---|
| Compound | Neat | With Stoichiometric $H_2O$ | Double Stoichiometric $H_2O$ |
| Salt-like Hydrides | | | |
| LiH | 12.68 | 11.89 | 7.76 |
| NaH | 4.20 | 6.11 | 4.80 |
| KH | 2.51 | 4.10 | 3.47 |
| RbH | 1.17 | 2.11 | 1.93 |
| CsH | 0.75 | 1.41 | 1.33 |
| $MgH_2$ | 7.66 | 9.09 | 6.47 |
| $CaH_2$ | 4.79 | 6.71 | 5.16 |
| Covalent Hydrides | | | |
| $LiBH_4$ | 18.51 | 13.95 | 8.59 |
| $NaBH_4$ | 10.66 | 10.92 | 7.34 |
| $KBH_4$ | 7.47 | 8.96 | 6.40 |
| $Mg(BH_4)_2$ | 11.94 | 12.79 | 8.14 |
| $Ca(BH_4)_2$ | 11.56 | 11.37 | 7.54 |
| $LiAlH_4$ | 10.62 | 10.90 | 7.33 |
| $NaAlH_4$ | 7.47 | 8.96 | 6.40 |
| $KAlH_4$ | 5.75 | 7.60 | 5.67 |
| $Li_3AlH_6$ | 11.23 | 11.21 | 7.47 |
| $Na_3AlH_6$ | 5.93 | 7.75 | 5.76 |

TABLE 2

Hydrogen Yield from the Hydrolysis of Metal Hydrides

| | | Hydrogen Yield (wt %) | |
|---|---|---|---|
| Reaction | Equation No. | Stoichiometric Water | Double Water |
| Reaction to Oxide | | | |
| $LiBH_4 + 2H_2O \rightarrow LiBO_2 + 4H_2$ | 1 | 13.95 | 8.59 |
| $2LiH + H_2O \rightarrow Li_2O + 2H_2$ | 2 | 11.89 | 7.76 |
| $NaBH_4 + 2H_2O \rightarrow NaBO_2 + 4H_2$ | 3 | 10.92 | 7.34 |
| $LiAlH_4 + 2H_2O \rightarrow LiAlO_2 + 4H_2$ | 4 | 10.90 | 7.33 |
| Reaction to Hydroxide | | | |
| $LiBH_4 + 4H_2O \rightarrow LiB(OH)_4 + 4H_2$ | 5 | 8.59 | 4.86 |
| $LiH + H_2O \rightarrow LiOH + H_2$ | 6 | 7.76 | 4.58 |
| $NaBH_4 + 4H_2O \rightarrow NaB(OH)_4 + 4H_2$ | 7 | 7.34 | 4.43 |
| $LiAlH_4 + 4H_2O \rightarrow LiAl(OH)_4 + 4H_2$ | 8 | 7.33 | 4.43 |
| Reaction to Hydrate Complex | | | |
| $LiH + 2H_2O \rightarrow LiOH.H_2O + H_2$ | 9 | 4.58 | 2.52 |
| $2LiAlH_4 + 10H_2O \rightarrow LiAl_2(OH)_7.H_2O + LiOH.H_2O + 8H_2$ | 10 | 6.30 | 3.70 |
| $NaBH_4 + 6H_2O \rightarrow NaBO_2.4H_2O + 4H_2$ | 11 | 5.49 | 3.15 |

The salt-like hydrides, such as LiH, NaH, and $MgH_2$, are generally not soluble in most common solvents under near ambient conditions. Many of these compounds are only stable as solids, and decompose when heated, rather than melting congruently. These compounds tend to react spontaneously with water to produce hydrogen, and continue to react as long as there is contact between the water and the salt-like hydride. In some cases the reaction products may form a blocking layer that slows or stops the reaction, but breaking up or dispersing the blocking layer or removing it from the reaction zone immediately returns the reaction to its initial rate as the water can again contact the unreacted hydride. Methods for controlling the hydrogen production from the salt-like compounds generally include controlling the rate of water addition.

The covalent hydrides shown in TABLE 1 are comprised of a covalently bonded hydride anion, e.g., $BH_4^-$, $AlH_4^-$, and a simple cation, e.g., $Na^+$, $Li^+$. These compounds are frequently soluble in high dielectric solvents, although some decomposition may occur. For example, $NaBH_4$ promptly reacts with water at neutral or acidic pH but is kinetically quite slow at alkaline pH. When $NaBH_4$ is added to neutral pH water, the reaction proceeds but, because the product is alkaline, the reaction slows to a near stop as the pH of the water rises and a metastable solution is formed. In fact, a basic solution of $NaBH_4$ is stable for months at temperatures below 5° C.

Some of the covalent hydrides, such as $LiAlH_4$, react very similarly to the salt-like hydrides and react with water in a hydrolysis reaction as long as water remains in contact with the hydrides. Others covalent hydrides react similarly to $NaBH_4$ and $KBH_4$ and only react with water to a limited extent, forming metastable solutions. However, in the presence of catalysts, these metastable solutions continue to react and generate hydrogen.

Using a catalyst to drive the hydration reaction of the covalent hydrides to completion by forming hydrates and hydrogen is advantageous because the weight percent of hydrogen available in the covalent hydrates is generally higher than that available in the salt-like hydrides, as shown in TABLE 1. Therefore, the covalent hydrides are preferred as a hydrogen source in some embodiments of a hydrogen generator because of their higher hydrogen content as a weight percent of the total mass of the generator.

The devices and methodologies described herein may use solid chemical hydrides as the hydrogen-containing material which is combined with water in a manner that facilitates a hydrolysis reaction to generate hydrogen gas. Preferably, these chemical hydrides include alkali metal borohydrides, alkali metal hydrides, metal borohydrides, and metal hydrides, including, but not limited to, sodium borohydride $NaBH_4$ (sometimes designated NBH), sodium hydride (NaH), lithium borohydride ($LiBH_4$), lithium hydride (LiH), calcium hydride ($CaH_2$), calcium borohydride ($Ca(BH_4)_2$), magnesium borohydride ($MgBH_4$), potassium borohydride ($KBH_4$), and aluminum borohydride ($Al(BH_4)_3$).

Another class of materials that may be useful in the devices and methodologies described herein are chemical hydrides with empirical formula $B_xN_xH_y$ and various compounds of the general formula $B_xN_3H_z$. Specific examples of these materials include aminoboranes such as ammoniaborane ($H_3BNH_3$), diborane diammoniate, $H_2B(NH_3)_2BH_4$, poly-(aminoborane), borazine ($B_3N_3H_6$), morpholine borane, borane-tetrahydrofuran complex, diborane, and the like. In some applications, hydrazine and its derivatives may also be useful, especially in applications where the toxicity of many hydrazine compounds is trumped by other considerations.

Various hydrogen gas-generating formulations may be prepared using these or other aminoboranes (or their derivatives). In some cases, the aminoboranes may be mixed and ball milled together with a reactive heat-generating compound, such as $LiAlH_4$, or with a mixture, such as $NaBH_4$ and $Fe_2O_3$. Upon ignition, the heat-generating compound in the mixture undergoes an exothermic reaction, and the energy released by this reaction pyrolyzes the aminoborane(s), thus forming boron nitride (BN) and $H_2$ gas. A heating wire, comprising nichrome or other suitable materials, may be used to initiate a self-sustaining reaction within these compositions.

4. Catalysts

As noted above, in some instances, a catalyst may be required to initiate the hydrolysis reaction of the chemical hydride with water. Useful catalysts for this purpose include one or more of the transition metals found in Groups IB-VIII of the Periodic Table. The catalyst may comprise one or more of the precious metals and/or may include cobalt, nickel, tungsten carbide or combinations thereof. Ruthenium, ruthenium chloride and combinations thereof are preferred catalysts.

Various organic pigments may also be useful in catalyzing the hydrolysis reaction. Some non-limiting examples of these materials include pyranthrenedione, indanthrene Gold Orange, ditridecyl-3,4,9,10-perylenetetracarboxylic diimide, indanthrene black, dimethoxy violanthrone, quinacridone, 1,4-di-keto-pyrrolo (3,4 C) pyrrole, indanthrene yellow, copper phthalocyanine, 3,4,9,10, perylenetetracarboxylic dianhydride, isoviolanthrone, perylenetetracarboxylic diimide, and perylene diimide. These materials, most of which are not metal based, may offer environmental or cost advantages in certain applications.

The catalysts used in the devices and methodologies disclosed herein may be present as powders, blacks, salts of the active metal, oxides, mixed oxides, organometallic compounds, or combinations of the foregoing. For those catalysts that are active metals, oxides, mixed oxides or combinations thereof, the hydrogen generator may further comprise a support for supporting the catalyst on a surface thereof.

The catalyst can be incorporated into the hydrolysis reaction in a variety of ways, including, but not limited to: (i) mixing the catalyst with the hydrogen-containing material first, and then adding water to the hydrogen-containing material/catalyst mixture; (ii) mixing the catalyst with the reactant water first, and then adding this solution/mixture to the hydrogen-containing material; or (iii) combining the hydrogen-containing material with water in the presence of a porous structure that is made of, or contains, a catalyst. The hydrogen generating devices described herein can be adapted to support one or more of these methods for incorporating catalyst into a reactor.

Catalyst concentrations in the hydrogen-generating compositions described herein may vary widely. For some applications, the set catalyst concentration may range between about 0.1 wt % to about 20 wt % active metals based on the total amount of hydride and on the active element or elements in the catalyst. Preferably, the set catalyst concentration may range from between about 0.1 wt % to about 15 wt %, and more preferably, between about 0.3 wt % to about 7 wt %.

5. Reaction Interface

Various materials may be used in the reaction interface in the hydrogen generators described herein. Preferably, the reaction interface is sufficiently porous to permit the egress of spent hydrogen-containing material (e.g., sodium borate and its hydrates) through the interface, but has sufficient strength to withstand the pressure exerted on it by the compression mechanism within the dispenser. The reaction interface also preferably exhibits sufficient wicking action so that water applied to it will be evenly distributed across its surface.

In some embodiments, this interface may contain multiple components. For example, the interface may contain a first layer of a porous material, such as screening or plastic or wire mesh or foam, and a second layer of a porous wicking agent. In other embodiments, these elements may be combined (for example, a suitable wicking agent may be deposited on the surfaces of a wire or plastic mesh or foam, or the mesh itself may have wicking characteristics). Specific, non-limiting examples of foams that may be used in the reaction interface include aluminum, nickel, copper, titanium, silver, stainless steel, and carbon foams. The surface of the foam may be treated to increase a hydrophilic nature of the surface. Cellular concrete may also be used in the reaction interface.

The temperature of the reaction interface is an important consideration in many of the embodiments of the devices and methodologies disclosed herein, and hence, various heating elements and temperature monitoring or temperature control devices may be utilized to maintain the reaction interface at a desired temperature. For example, when sodium borohydride is utilized as the hydrogen-containing material, the sodium borate reaction byproduct can exist in various hydration states, and the population of each of these states is a function of temperature. Thus, at 40° C., the tetrahydrate species is the principal reaction product, while at 60° C., the dihydrate species is the principal reaction product, and at 100° C., the monohydrate species is the principal reaction product. From a weight penalty standpoint, it is preferable that the reaction interface be maintained at a temperature that will favor the formation of anhydrous or lower hydrate species, since this will require less water to evolve a given volume of hydrogen gas. Moreover, the resulting system will, in many cases, be less prone to the condensation issues described herein, even if no desiccant is employed in the hydrogen gas stream.

The use of chelating agents for the reaction byproducts may also be useful in the devices and methodologies described herein. For example, when sodium borohydride is used as the hydrogen-containing material, a chelating agent may be added to the sodium borohydride, or to the water or other liquid it is reacted with. Such a material binds the sodium borate reaction byproduct and, by occupying ligand sites, prevents or minimizes the formation of hydrates, especially higher order hydrates. Hence, chelating agents may be advantageously used in some instances to reduce the weight penalty associated with the system.

6. Control Devices

As previously noted, the hydrogen generators described herein include an inlet into the reaction chamber for the introduction of water therein, and an outlet from the reaction chamber for the evolved hydrogen to exit the generator. Both the inlet and the outlet of the reaction chamber may comprise various fluid control devices such as, for example, check valves, ball valves, gate valves, globe valves, needle valves, or combinations thereof. These control devices may further comprise one or more pneumatic or electric actuators and the hydrogen generator may further include a controller in electric or pneumatic communication with one or more of these actuators for controlling the open or closed position of the fluid control devices. Suitable circuitry, chips, and/or displays may also be provided for control purposes.

7. Antifoaming Agents

In some embodiments of the devices and methodologies disclosed herein, an antifoaming agent is added to the water that is introduced into the reaction chamber. The use of an antifoaming agent may be advantageous in some applications or embodiments, since the generation of hydrogen during the hydration reaction frequently causes foaming. Hence, by adding an antifoaming agent to the reactant water, the size and weight of the hydrogen generator can be minimized, since less volume is required for disengagement of the gas from the liquid/solids. Polyglycol anti-foaming agents offer efficient distribution in aqueous systems and are tolerant of the alkaline pH conditions found in hydrolyzing borohydride solutions. Other antifoam agents may include surfactants, glycols, polyols and other agents known to those having ordinary skill in the art.

8. pH Adjusting Agents

Various pH adjusting agents may be used in the devices and methodologies disclosed herein. The use of these agents is advantageous in that the hydration reaction typically proceeds at a faster rate at lower pHs. Hence, the addition of a suitable acid to the reaction chamber, as by premixing the acid into the reactant water, may accelerate the evolution of hydrogen gas. Indeed, in some cases, the use of a suitable acid eliminates the need for a catalyst. Some non-limiting examples of acids that may be suitable for this purpose include, for example, boric acid, mineral acids, carboxylic acids, sulfonic acids and phosphoric acids. The use of boric acid is particularly desirable in some applications, since it aids recycling by avoiding the addition to the reaction byproduct mixture of additional heterotaoms, as would be the case, for example, with sulfuric acid or phosphoric acid. Moreover, boric acid is a solid and can be readily mixed with the hydrogen-containing material if desired; by contrast, other pH adjusting agents must be added to the aqueous solution or other material being reacted with the hydrogen-containing material.

9. Wicking Agents

As previously noted, the hydration reaction of a hydride cannot proceed if water is unable to reach the hydride. When pellets of some hydrides, such as LiH, react with water, a layer of insoluble reaction products is formed that blocks further contact of the water with the hydride. The blockage can slow down or stop the reaction.

The devices and methodologies disclosed herein overcome this problem by providing a means for expelling such insoluble products from the reaction zone. However, in some cases, the addition of a wicking agent within the pellets or granules of the hydride or borohydride improves the water distribution through the pellet or granule and ensures that the hydration reaction quickly proceeds to completion. Both salt-like hydrides and covalent hydrides benefit from an effective dispersion of water throughout the hydride. Useful wicking materials include, for example, cellulose fibers like paper and cotton, modified polyester materials having a surface treatment to enhance water transport along the surface without absorption into the fiber, and polyacrylamide, the active component of disposable diapers. The wicking agents may be added to the hydrogen-containing material in any effective amount, preferably in amounts between about 0.5 wt % and about 15 wt % and most preferably, between about 1 wt % and about 2 wt %. It should be noted, however, that, in some applications, variations in the quantity of wicking material added to the hydrogen-containing material do not seem to be significant; i.e., a small amount of wicking material is essentially as effective as a large amount of wicking material.

10. Liquid Reactants

While the devices and methodologies described herein have frequently been explained in reference to the use of water as a reactant with the hydride, borohydride, borane, or other hydrogen containing material, it will be appreciated that various other materials may be used in place of, or in addition to, water. For example, various alcohols, including may be reacted with the hydrogen-containing material. Of these, low molecular weight alcohols, such as methanol, ethanol, normal and iso-propanol, normal, iso- and secondary-butanol, ethylene glycol, propylene glycol, butylene glycol, and mixtures thereof, are especially preferred. The alcohols may be used either alone or as aqueous solutions of varying concentrations. Liquid reactants containing alcohol may be particularly useful in low temperature applications where the liquid reactant may be subjected to freezing. Various liquid reactants containing ammonia or other hydrogen containing materials may also be used.

The above description of the devices and methodologies that are the subject of the present disclosure is illustrative, and is not intended to be limiting. It will thus be appreciated that various additions, substitutions and modifications may be made to the above described embodiments without departing from the scope of the present invention. Accordingly, the scope of the present invention should be construed in reference to the appended claims.

What is claimed is:

1. A device for generating hydrogen gas, comprising:
    a first hydrogen-containing composition that reacts with a second composition to evolve hydrogen gas; a first porous member comprising a metal foam
    a dispenser adapted to apply said first composition to said first porous member; and
    a conduit adapted to supply said second composition to said first porous member.

2. The device of claim 1, wherein said first composition comprises a material selected from the group consisting of hydrides, borohydrides and boranes.

3. The device of claim 1, wherein said first composition comprises sodium borohydride.

4. The device of claim 1, wherein said second composition comprises water.

5. The device of claim 1, wherein said first composition is disposed on a first side of said first porous member, and further comprising a reservoir disposed on a second side of said first porous member.

6. The device of claim 5, further comprising:
    an inlet adapted for the introduction of the second composition into the device;
    an outlet adapted for the removal of hydrogen gas from the device; and
    a second porous member disposed between said outlet and said first porous member.

7. The device of claim 6, further comprising a desiccant disposed between said first porous member and said outlet.

8. The device of claim 1, further comprising:
    an inlet adapted for the introduction of the second composition into the device; and
    an outlet adapted for the removal of hydrogen gas from the device;
    wherein said hydrogen-containing composition is present as a bed of particles, and wherein said outlet is disposed on an opposing side of the bed from said first porous member.

9. The device of claim 1, wherein said dispenser comprises a spring-activated piston.

10. The device of claim 1, further comprising:
    a housing that terminates on one end in said first porous member, said housing having a plug with first and second opposing surfaces; and
    a spring disposed within said housing, said spring being compressed against a first surface of said plug;
    wherein said first composition is compressed between said second surface of said plug and said first porous member.

11. The device of claim 5, wherein said dispenser comprises a piston selected from the group consisting of pneumatic pistons and hydraulic pistons.

12. The device of claim 1, wherein said dispenser is equipped with a pressurized bladder that presses said first composition against said porous member.

13. The device of claim 1, wherein said dispenser is equipped with a water-swellable material that presses said first composition against said porous member.

14. The device of claim 13, wherein said water-swellable material, said first composition and said porous member are arranged in a series of alternating layers.

15. The device of claim 14, wherein said alternating layers are disposed in an essentially concentric configuration.

16. The device of claim 14, wherein said alternating layers are disposed in an essentially helical configuration.

17. The device of claim 14, wherein said alternating layers are disposed in a stack of essentially planar layers.

18. The device of claim 1, wherein said first porous member comprises a metal foam.

19. The device of claim 1, wherein said second composition comprises a chelating agent.

20. The device of claim 1, wherein said first composition is a solid material and wherein said second composition is a liquid material.

21. The device of claim 20, wherein said first material reacts with said second material to evolve hydrogen gas and a mud-like reaction byproduct, wherein said first material is disposed on a first side of said first porous member, and wherein said dispenser is further adapted to dispense said byproduct across, and to a second side of, said porous member.

22. The device of claim 1, wherein said dispenser utilizes compressive force to maintain contact between said first composition and said first porous member.

23. A device, comprising:
    a chamber equipped with a porous interface;
    a first material disposed within said chamber, wherein the first material reacts with a second material to generate hydrogen gas, and wherein the first material is maintained in a state in which it is pressed against the porous interface by way of an element selected from the group consisting of springs, pistons, pressurized gas, and flexible bladders; and
    a conduit for applying the second material in liquid form to the interface while the compressive force is being applied to the first material.

24. The device of claim 23, wherein the first material is maintained in a state in which it is pressed against the porous interface by way of a spring.

25. The device of claim 23, wherein the first material is maintained in a state in which it is pressed against the porous interface by way of a piston.

26. The device of claim 23, wherein the first material is maintained in a state in which it is pressed against the porous interface by way of a pressurized gas.

27. The device of claim 23, wherein the first material is maintained in a state in which it is pressed against the porous interface by way of a flexible bladder.

28. The device of claim 23, wherein said first composition comprises a material selected from the group consisting of hydrides, borohydrides and boranes.

29. The device of claim 23, wherein said first composition comprises sodium borohydride, and wherein said second composition comprises water.

30. The device of claim 23, wherein said first composition is disposed on a first side of said first porous member, and further comprising:
a reservoir disposed on a second side of said first porous member;
an inlet adapted for the introduction of the second composition into the device;
an outlet adapted for the removal of hydrogen gas from the device; and
a second porous member disposed between said outlet and said first porous member.

31. The device of claim 23, further comprising:
an inlet adapted for the introduction of the second composition into the device; and
an outlet adapted for the removal of hydrogen gas from the device;
wherein said hydrogen-containing composition is present as a bed of particles, and wherein said outlet is disposed on an opposing side of the bed from said first porous member.

32. The device of claim 23, further comprising:
a housing that terminates on one end in said first porous member, said housing having a plug with first and second opposing surfaces; and
a spring disposed within said housing, said spring being compressed against a first surface of said plug;
wherein said first composition is compressed between said second surface of said plug and said first porous member.

33. The device of claim 23, wherein said first porous member comprises a metal foam.

34. A device for generating hydrogen gas, comprising:
a first hydrogen-containing composition that reacts with a second composition to evolve hydrogen gas; a first porous member;
a dispenser which comprises a piston and which is adapted to apply said first composition to said first porous member; and
a conduit adapted to supply said second composition to said first porous member.

35. The device of claim 34, wherein said piston is a spring-activated piston.

36. The device of claim 34, wherein said piston is a pneumatic piston.

37. The device of claim 34, wherein said piston is a hydraulic piston.

38. The device of claim 34, wherein said first composition comprises a material selected from the group consisting of hydrides, borohydrides and boranes.

39. The device of claim 34, wherein said first composition comprises sodium borohydride, and wherein said second composition comprises water.

40. The device of claim 34, wherein said first composition is disposed on a first side of said first porous member, and further comprising a reservoir disposed on a second side of said first porous member.

41. The device of claim 40, further comprising:
an inlet adapted for the introduction of the second composition into the device;
an outlet adapted for the removal of hydrogen gas from the device; and
a second porous member disposed between said outlet and said first porous member.

42. The device of claim 41, further comprising a desiccant disposed between said first porous member and said outlet.

43. The device of claim 34, further comprising:
an inlet adapted for the introduction of the second composition into the device; and
an outlet adapted for the removal of hydrogen gas from the device;
wherein said hydrogen-containing composition is present as a bed of particles, and wherein said outlet is disposed on an opposing side of the bed from said first porous member.

44. The device of claim 34, further comprising:
a housing that terminates on one end in said first porous member, said housing having a plug with first and second opposing surfaces; and
a spring disposed within said housing, said spring being compressed against a first surface of said plug;
wherein said first composition is compressed between said second surface of said plug and said first porous member.

45. The device of claim 34, wherein said dispenser is equipped with a pressurized bladder that presses said first composition against said first porous member.

46. The device of claim 34, wherein said dispenser is equipped with a water-swellable material that presses said first composition against said first porous member.

47. The device of claim 46, wherein said water-swellable material, said first composition and said first porous member are arranged in a series of alternating layers.

48. The device of claim 47, wherein said alternating layers are disposed in an essentially concentric configuration.

49. The device of claim 47, wherein said alternating layers are disposed in an essentially helical configuration.

50. The device of claim 47, wherein said alternating layers are disposed in a stack of essentially planar layers.

51. The device of claim 34, wherein said first porous member comprises a metal foam.

52. The device of claim 34, wherein said second composition comprises a chelating agent.

53. The device of claim 34, wherein said first composition is a solid material and wherein said second composition is a liquid material.

54. A device for generating hydrogen gas, comprising:
a first hydrogen-containing composition that reacts with a second composition to evolve hydrogen gas; a first porous member;
a dispenser adapted to apply said first composition to said first porous member;
a conduit adapted to supply said second composition to said first porous member;
a housing that terminates on one end in said first porous member, said housing having a plug with first and second opposing surfaces; and
a spring disposed within said housing, said spring being compressed against a first surface of said plug;
wherein said first composition is compressed between said second surface of said plug and said first porous member.

55. The device of claim 54, wherein said first composition comprises a material selected from the group consisting of hydrides, borohydrides and boranes.

56. The device of claim 54, wherein said first composition comprises sodium borohydride, and wherein said second composition comprises water.

57. The device of claim 54, wherein said first composition is disposed on a first side of said first porous member, and further comprising a reservoir disposed on a second side of said first porous member.

58. The device of claim 57, further comprising:
an inlet adapted for the introduction of the second composition into the device;

an outlet adapted for the removal of hydrogen gas from the device; and a second porous member disposed between said outlet and said first porous member.

59. The device of claim 58, further comprising a desiccant disposed between said first porous member and said outlet.

60. The device of claim 54, further comprising:

an inlet adapted for the introduction of the second composition into the device; and an outlet adapted for the removal of hydrogen gas from the device;

wherein said hydrogen-containing composition is present as a bed of particles, and wherein said outlet is disposed on an opposing side of the bed from said first porous member.

61. The device of claim 54, further comprising:

a housing that terminates on one end in said first porous member, said housing having a plug with first and second opposing surfaces; and a spring disposed within said housing, said spring being compressed against a first surface of said plug;

wherein said first composition is compressed between said second surface of said plug and said first porous member.

62. The device of claim 54, wherein said dispenser is equipped with a pressurized bladder that presses said first composition against said porous member.

63. The device of claim 54, wherein said dispenser is equipped with a water-swellable material that presses said first composition against said porous member.

64. The device of claim 63, wherein said water-swellable material, said first composition and said porous member are arranged in a series of alternating layers.

65. The device of claim 54, wherein said first porous member comprises a metal foam.

66. The device of claim 54, wherein said second composition comprises a chelating agent.

67. The device of claim 54, wherein said first composition is a solid material and wherein said second composition is a liquid material.

68. A device for generating hydrogen gas, comprising:

a first hydrogen-containing composition that reacts with a second composition to evolve hydrogen gas;

a first porous member;

a dispenser equipped with a pressurized bladder which is adapted to apply said first composition to said first porous member and to press said first composition against said first porous member; and a conduit adapted to supply said second composition to said first porous member.

69. The device of claim 68, wherein said first composition comprises a material selected from the group consisting of hydrides, borohydrides and boranes.

70. The device of claim 68, wherein said first composition comprises sodium borohydride, and wherein said second composition comprises water.

71. The device of claim 68, wherein said first composition is disposed on a first side of said first porous member, and further comprising a reservoir disposed on a second side of said first porous member.

72. The device of claim 71, further comprising:

an inlet adapted for the introduction of the second composition into the device;

an outlet adapted for the removal of hydrogen gas from the device; and a second porous member disposed between said outlet and said first porous member.

73. The device of claim 68, further comprising:

an inlet adapted for the introduction of the second composition into the device; and an outlet adapted for the removal of hydrogen gas from the device;

wherein said hydrogen-containing composition is present as a bed of particles, and wherein said outlet is disposed on an opposing side of the bed from said first porous member.

74. The device of claim 68, further comprising:

a housing that terminates on one end in said first porous member, said housing having a plug with first and second opposing surfaces; and a spring disposed within said housing, said spring being compressed against a first surface of said plug;

wherein said first composition is compressed between said second surface of said plug and said first porous member.

75. The device of claim 68, wherein said first porous member comprises a metal foam.

76. The device of claim 68, wherein said first composition is a solid material and wherein said second composition is a liquid material.

* * * * *